(12) United States Patent
Niizuma et al.

(10) Patent No.: US 12,715,316 B2
(45) Date of Patent: Aug. 25, 2026

(54) COIL DEVICE, POWER SUPPLY DEVICE, AND DETECTION DEVICE

(71) Applicant: IHI Corporation, Tokyo (JP)

(72) Inventors: Motonao Niizuma, Tokyo (JP); Kenji Nishimura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 925 days.

(21) Appl. No.: 17/626,225

(22) PCT Filed: Aug. 6, 2020

(86) PCT No.: PCT/JP2020/030229

§ 371 (c)(1),
(2) Date: Jan. 11, 2022

(87) PCT Pub. No.: WO2021/039351

PCT Pub. Date: Mar. 4, 2021

(65) Prior Publication Data

US 2022/0258621 A1 Aug. 18, 2022

(51) Int. Cl.

| | |
|---|---|
| ***B60L 53/12*** | (2019.01) |
| ***B60L 53/60*** | (2019.01) |
| ***H01F 27/02*** | (2006.01) |
| ***H01F 27/28*** | (2006.01) |
| ***H02J 50/12*** | (2016.01) |
| ***H02J 50/90*** | (2016.01) |

(52) U.S. Cl.

CPC ............... *B60L 53/12* (2019.02); *B60L 53/60* (2019.02); *H01F 27/02* (2013.01); *H01F 27/2823* (2013.01); *H02J 50/12* (2016.02); *H02J 50/90* (2016.02)

(58) Field of Classification Search

CPC ........................................................ H02J 50/10
USPC ........................................................ 320/108
See application file for complete search history.

(56) References Cited

U.S. PATENT DOCUMENTS

| | | | | |
|---|---|---|---|---|
| 2009/0094700 | A1 | 4/2009 | Goto et al. | |
| 2014/0097794 | A1 | 4/2014 | Elias et al. | |
| 2015/0364924 | A1 | 12/2015 | Yuasa | |
| 2016/0006260 | A1 | 1/2016 | Nakamura et al. | |
| 2016/0016478 | A1* | 1/2016 | Saito | H01F 27/402 307/104 |
| 2016/0134162 | A1* | 5/2016 | Koizumi | H02J 50/10 307/104 |

(Continued)

FOREIGN PATENT DOCUMENTS

| | | | |
|---|---|---|---|
| DE | 102012025273 | A1 | 6/2014 |
| DE | 102014017068 | A1 | 6/2015 |
| JP | 2000-150685 | A | 5/2000 |

(Continued)

*Primary Examiner* — Ahmed H Omar
(74) *Attorney, Agent, or Firm* — Volpe Koenig

(57) ABSTRACT

A coil device according to one aspect of the present disclosure includes a coil generating a magnetic field, a casing accommodating the coil, a conductive part including an input part, an output part, and a conductive pattern connecting the input part to the output part, the conductive part being provided on the casing, and electrically insulated from the casing, and a detection part electrically connected to the input part and the output part, energizing the conductive pattern via the input part and the output part, and detecting deformation in the casing based on an energized state of the conductive pattern.

8 Claims, 21 Drawing Sheets

(56) References Cited

U.S. PATENT DOCUMENTS

| | | | | |
|---|---|---|---|---|
| 2016/0238731 | A1* | 8/2016 | Chopra | H02J 50/12 |
| 2018/0145002 | A1* | 5/2018 | Munder | H01L 23/66 |

FOREIGN PATENT DOCUMENTS

| | | | | | |
|---|---|---|---|---|---|
| JP | 2000150685 | | * | 5/2000 | H01L 23/00 |
| JP | 2001-174210 | A | | 6/2001 | |
| JP | 2005-010909 | A | | 1/2005 | |
| JP | 2006-128546 | A | | 5/2006 | |
| JP | 2010-020657 | A | | 1/2010 | |
| JP | 2012095482 | A | * | 5/2012 | B60L 3/04 |
| JP | 2013-192450 | A | | 9/2013 | |
| JP | 2014-121124 | A | | 6/2014 | |
| JP | 2014-197926 | A | | 10/2014 | |
| JP | 2015-019508 | A | | 1/2015 | |
| JP | 2016-001940 | A | | 1/2016 | |
| JP | 2016-019305 | A | | 2/2016 | |

* cited by examiner 2
22(20)
22b
10
P1
P2
RP
43x
40(60)
41
42
43
43a
43b
Ca
Cb
52(60)
C2(25)
III
Y
X
Z
5
51
DETECTION POWER SOURCE
D1
D2
53
CONTROL PART
D3
D4
100
DRIVE POWER SOURCE
30

Figure 5:
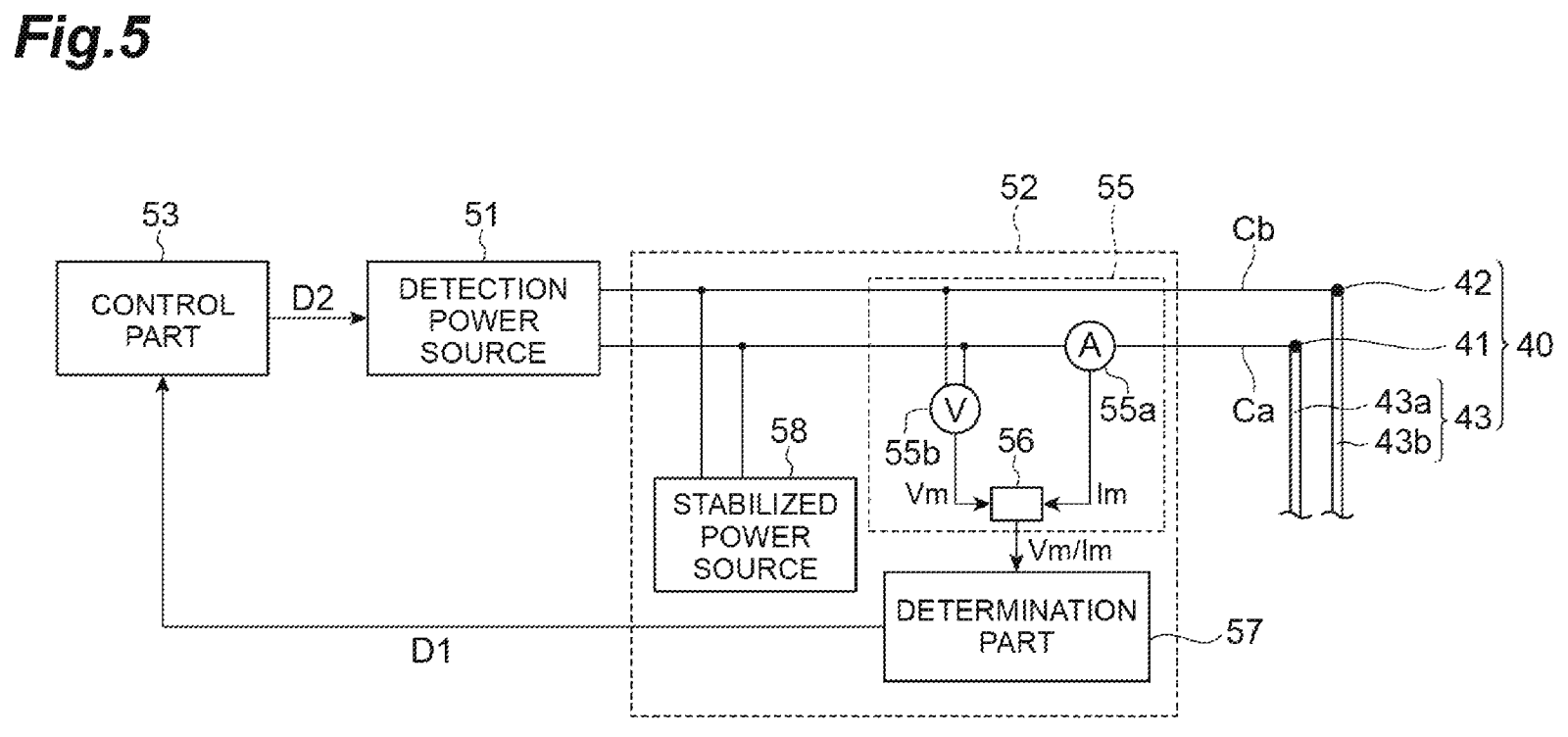

CONTROL PART
53
D2
DETECTION POWER SOURCE
51
D1
STABILIZED POWER SOURCE
58
DETERMINATION PART
57
52
55
55a
55b
56
A
V
Im
Vm
Vm/Im
Cb
Ca
42
41
40
43
43a
43b

START
S11
START POWER SUPPLY TO POWER TRANSMITTING COIL?
NO
YES
START POWER SUPPLY TO DETECTION PART
S12
S13
HAS DEFORMATION OCCURRED IN CASING?
NO
YES
ISSUE WARNING TO ADMINISTRATOR AND STOP POWER SUPPLY TO DETECTION PART
S14
STOP POWER SUPPLY TO DETECTION PART
S15
START POWER SUPPLY TO POWER TRANSMITTING COIL
S16
END POWER SUPPLY TO POWER TRANSMITTING COIL
S17
END 10A
20
22
21
Z
Y
X
43A
43c
F
43d
22b
22a
28
27
26
25
C2
Cb
Ca
52

CONTROL PART
DETECTION POWER SOURCE
ELECTRIC POWER CONVERTER
STABILIZED POWER SOURCE
DETERMINATION PART

COIL DEVICE, POWER SUPPLY DEVICE, AND DETECTION DEVICE

TECHNICAL FIELD

The present disclosure relates to a coil device, a power supply device, and a detection device.

BACKGROUND ART

Patent Literatures 1 and 2 disclose a technique relating to a coil device that is installed on a vehicle driving surface and wirelessly transmits electric power to vehicles. Specifically, Patent Literatures 1 and 2 disclose the technique of suppressing damage to a coil unit caused by the vehicle coming into contact with the coil device. Patent Literature 3 discloses a technique capable of detecting that a hole has been formed in a surface of a case which accommodates electrical equipment. The technique disclosed in Patent Literature 3 enables detection of whether a hole has been formed in the case by detecting whether an electrically conductive pattern formed on an inner surface of the case has been cut.

CITATION LIST

Patent Literature

Patent Literature 1: Japanese Unexamined Patent Publication No. 2016-1940
Patent Literature 2: Japanese Unexamined Patent Publication No. 2014-197926
Patent Literature 3: Japanese Unexamined Patent Publication No. 2000-150685

SUMMARY OF INVENTION

Technical Problem

For example, when the coil device is used as a charging facility for movable objects such as vehicles or drones, a power receiving side coil device may be installed in the movable object and a power transmitting side coil device may be installed outdoors. When the coil device installed outdoors is exposed to wind and rain, rainwater and the like may intrude into the casing of the coil device and cause performance degradation of the coil device such as reduction in insulating properties of the inside of the casing. It is thus important to ensure the seal of the casing so that rainwater and the like do not intrude into the casing.

However, when the movable object impacts the coil device, the seal of the casing may be impaired due to the damage to the casing. If the coil device is operated in such a condition in which its performance may be degraded, power transmission or reception by the coil device tend to become unstable. Patent Literatures 1 and 2 contemplate suppressing damage to the casing caused by such impact by movable objects. However, Patent Literatures 1 and 2 do not specifically contemplate the measures to be taken in the event that the casing is damaged.

Solution to Problem

A coil device according to one aspect of the present disclosure includes a coil generating a magnetic field, a casing accommodating the coil, a conductive part including an input part, an output part, and a conductive pattern connecting the input part to the output part, the conductive part being provided on the casing, and electrically insulated from the casing, and a detection part electrically connected to the input part and the output part, energizing the conductive pattern via the input part and the output part, and detecting deformation in the casing based on an energized state of the conductive pattern.

Advantageous Effects of Invention

The present disclosure provides a coil device, a power supply device, and a detection device which are capable of achieving stable power transmission or reception.

BRIEF DESCRIPTION OF DRAWINGS

FIG. 5 is a diagram illustrating a configuration of a detection part.

FIG. 13 is a cross-sectional view illustrating a fourth variation of the coil device.

FIG. 19 is a diagram illustrating a variation of the detection part.

DESCRIPTION OF EMBODIMENTS

Figure 1:
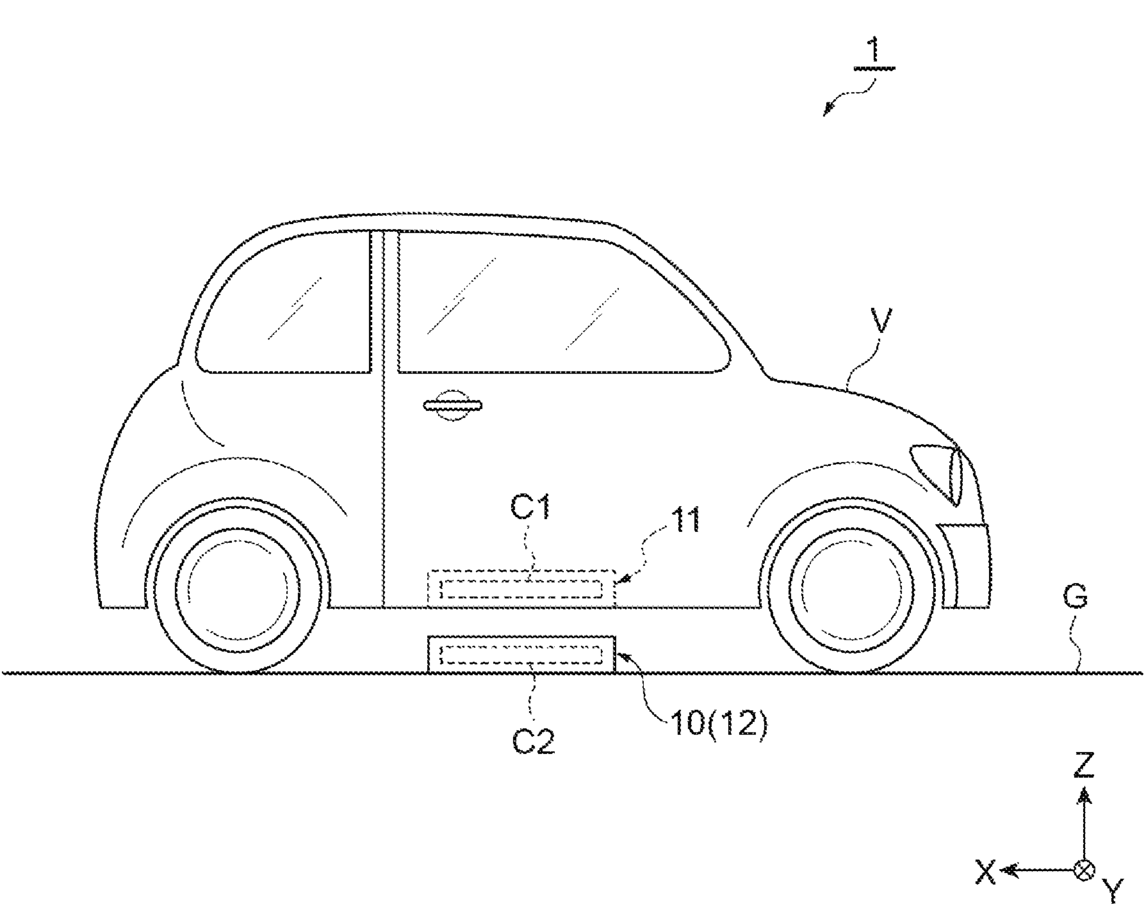
FIG. 1 is a side view illustrating a wireless power supply system having a coil device according to an embodiment.

A coil device according to one aspect of the present disclosure includes a coil generating a magnetic field, a casing accommodating the coil, a conductive part including an input part, an output part, and a conductive pattern connecting the input part to the output part, the conductive part being provided on the casing, and electrically insulated from the casing, and a detection part electrically connected to the input part and the output part, energizing the conductive pattern via the input part and the output part, and detecting deformation in the casing based on an energized state of the conductive pattern.

In this coil device, the detection part energizes the conductive pattern of the conductive part provided on the casing. When damage or a break occurs in the conductive pattern in this state, the energized state of the conductive pattern becomes abnormal. For example, when the conductive pattern breaks, no electric current will flow in the conductive pattern, and electrical resistance between the input part and the output part will be infinite. In such a case, it is likely that deformation such as damage or a crack has occurred in the casing. Accordingly, the detection part detects the deformation in the casing on the basis of the energized state of the conductive pattern. When the deformation in the casing can be detected, actions such as stopping the operation of the coil device can be taken. Thus, situations can be suppressed in which the coil device is operated in a state in which deformation has occurred in the casing, that is, in a state in which performance may be degraded. As a result, situations in which power transmission or reception by the coil is unstable can be suppressed.

In some aspects, the conductive pattern may include a first portion and a second portion arranged side by side on a pattern arrangement surface of the casing. Electric currents in the first portion and in the second portion flow in opposite directions when energized. In this case, an increase in an area of a surface region surrounded by the first portion and the second portion can be suppressed. An induced voltage generated by a magnetic field linking with the surface region is defined by a product of a component of the magnetic field in a normal direction of the surface region and the area of the surface region. An increase in the induced voltage can thus be suppressed by suppressing the increase in the area of the surface region. By suppressing the increase in the induced voltage in this manner, the impact of the induced voltage on the accuracy of detection by the detection part can be suppressed. This reduces the likelihood of false detections by the detection part caused by the generation of the induced voltage.

In some aspects, the second portion may be arranged side by side with the first portion along a direction intersecting a normal direction of the pattern arrangement surface, and may extend along a direction of extension of the first portion. In this case, the increase in the area of the surface region surrounded by the first portion and the second portion can be effectively suppressed. The increase in the induced voltage can thus be effectively suppressed, and the impact of the induced voltage on the accuracy of detection by the detection part can be effectively suppressed. As a result, the likelihood of false detections by the detection part caused by the generation of the induced voltage can be further reduced.

In some aspects, the second portion may be arranged side by side with the first portion along a direction intersecting a normal direction of the pattern arrangement surface, and may extend along a direction of extension of the first portion. In this case, the normal direction of the surface region of the conductive pattern surrounded by the first portion and the second portion can be substantially at a right angle to a direction of the magnetic field. The induced voltage generated by the magnetic field linking with the surface region is defined, as described above, by the product of the component of the magnetic field in the normal direction of the surface region and the area of the surface region. Thus, in the case in which the normal direction of the surface region is at a right angle to the direction of the magnetic field, the component of the magnetic field in the normal direction of the surface region is 0, and the induced voltage is also 0. In this configuration, since the normal direction of the surface region can be substantially at a right angle to the direction of the magnetic field, the induced voltage can be closer to 0, and the impact of the induced voltage on the accuracy of detection by the detection part can be minimized. This even further reduces the likelihood of false detections by the detection part caused by the generation of the induced voltage.

In some aspects, the second portion may include a crossing portion crossing the first portion when viewed in a normal direction of the pattern arrangement surface, and may be arranged side by side with the first portion along the normal direction at the crossing portion. In this case, the impact of the induced voltage on the accuracy of detection by the detection part can be further minimized by the second portion including the crossing portion. That is, the likelihood of false detections by the detection part caused by the generation of the induced voltage can be further reduced.

In some aspects, the conductive pattern may include a portion extending in one direction of in-plane directions of the pattern arrangement surface, and a portion extending in another of the in-plane directions intersecting the one direction. In this configuration, when damage or cracks occur in the one direction of the pattern arrangement surface, the detection part can detect the deformation in the casing using the portion of the conductive pattern extending in the other direction. When damage or cracks occur in the other direction of the pattern arrangement surface, the detection part can detect the deformation in the casing using the portion of the conductive pattern extending in the one direction. Thus, regardless of whether damage or cracks occur in the one direction or the other direction of the pattern arrangement surface, the detection part can more reliably detect the deformation in the casing on the basis of the energized state of the conductive pattern.

In some aspects, the pattern arrangement surface may be an inner surface of the casing facing the coil. In this case, situations in which the conductive part degrades due to exposure to rainwater and the like can be avoided. Additionally, since the conductive part is provided on the inner surface of the casing, the conductive part and the detection part can be electrically connected without forming a through hole in the casing. Situations in which the seal of the casing fails can thus be suppressed. As a result, situations in which the coil device is operated in a state in which performance may be degraded can be more reliably suppressed, and situations in which the power transmission or reception by the coil is unstable can be more reliably suppressed.

In some aspects, the casing may include a cover and a base defining an accommodation space for accommodating the coil. The cover may be removably attached to the base, and the input part and the output part may be provided on the cover. The detection part may include a pair of connection parts provided on the base, and the pair of connection parts may be electrically connected to the input part and the output part, respectively, by the cover being attached to the base. In a case in which deformation occurs in the cover of the casing, the cover in which the deformation has occurred may be removed, and a new cover with no deformation may be attached to the base. In the configuration above, the pair of connection parts of the detection part are electrically connected to the input part and the output part, respectively, of the conductive part by the cover being attached to the base.

This facilitates connecting the detection part to the conductive part when attaching a new cover to the base.

A power supply device according to one aspect of the present disclosure includes any one of the coil devices described above, and a power source part supplying electric power to the coil, wherein the power source part stops supplying electric power to the coil when the detection part detects the deformation in the casing. In this power supply device, situations in which the coil device is operated in a state in which deformation has occurred in the casing, that is, in a state in which performance may be degraded can be more reliably suppressed. Thus, situations in which the power transmission or reception by the coil is unstable can be more reliably suppressed.

A detection device according to one aspect of the present disclosure detects deformation in a casing of a coil device for wireless power supply, and includes a conductive part including an input part, an output part, and a conductive pattern connecting the input part to the output part, the conductive part being provided on the casing, and electrically insulated from the casing, and a detection part electrically connected to the input part and the output part, energizing the conductive pattern via the input part and the output part, and detecting the deformation in the casing based on an energized state of the conductive pattern.

In this detection device, the detection part energizes the conductive pattern of the conductive part provided on the casing. When damage or a break occurs in the conductive pattern in this state, the energized state of the conductive pattern becomes abnormal. For example, when the conductive pattern breaks, no electric current will flow in the conductive pattern, and electrical resistance between the input part and the output part will be infinite. In such a case, it is likely that deformation such as damage or a crack has occurred in the casing. Accordingly, the detection part detects the deformation in the casing on the basis of the energized state of the conductive pattern. When the deformation in the casing can be detected, actions such as stopping the operation of the coil device can be taken. Thus, situations can be suppressed in which the coil device is operated in a situation in which deformation has occurred in the casing, that is, in a state in which performance may be degraded. As a result, situations in which the power transmission or reception is unstable can be suppressed.

Embodiments of the present disclosure will be described in detail below with reference to the accompanying drawings. Like elements are given like reference signs in the description of the drawings and redundant explanation is omitted.

As shown in FIG. 1, a coil device 10 is used, for example, as a power receiving device 11 or a power transmitting device 12 in a wireless power supply system 1. The wireless power supply system 1, for example, charges a battery installed in a movable object V such as a vehicle or a drone. The coil device 10 may be used both as the power receiving device 11 and the power transmitting device 12.

When the coil device 10 is used as the power transmitting device 12, the coil device 10 as the power transmitting coil device 12 is secured, for example, to an outdoor road surface G. A drive power source 30 of a power source part 5 (see FIG. 2) is connected to a power transmitting coil C2 of the coil device 10. The power source part 5 includes the drive power source 30, and a detection power source 51 and a control part 53 (see FIG. 2) which are described later. The power source part 5 and the coil device 10 compose a power supply device 2. When the coil device 10 is used as the power receiving device 11, the coil device 10 as the power receiving device 11 is secured, for example, to a chassis of a vehicle. A power receiving coil C1 of the power receiving device 11 is connected to a battery via a receiving circuit and a charging circuit, and the like.

When the power transmitting device 12 and the power receiving device 11 face each other in an up-down direction, the power transmitting coil C2 and the power receiving coil C1 are electromagnetically coupled to form an electromagnetic coupling circuit. Electric power is thus wirelessly supplied from the power transmitting coil C2 to the power receiving coil C1. In other words, the power receiving coil C1 wirelessly receives electric power from the power transmitting coil C2. The electromagnetic coupling circuit may be a circuit that transmits and receives power by "electromagnetic induction," or a circuit that transmits and receives power by "magnetic resonance."

The coil device 10 will be described in further detail below with an aspect using the coil device 10 as the power transmitting device 12 as an example. In the description below, the up-down direction (for example, vertical direction) in which the power transmitting device 12 and the power receiving device 11 face each other is referred to as a Z direction, one direction of in-plane directions perpendicular to the Z direction is referred to as an X direction, and another direction of the in-plane directions perpendicular to the one direction is referred to as a Y direction.

Figure 2:
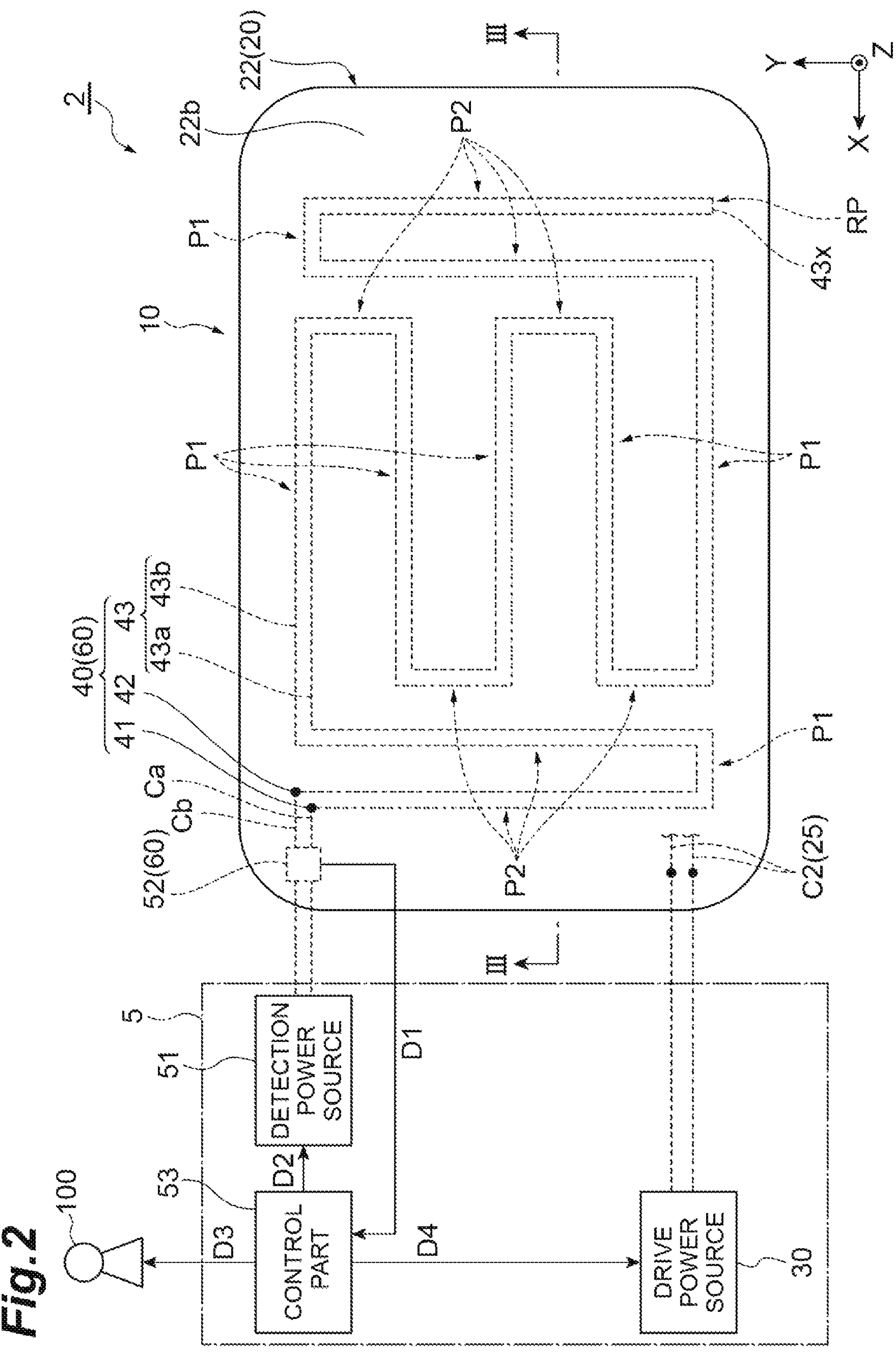
FIG. 2 is a top view illustrating the coil device.
Figure 3:
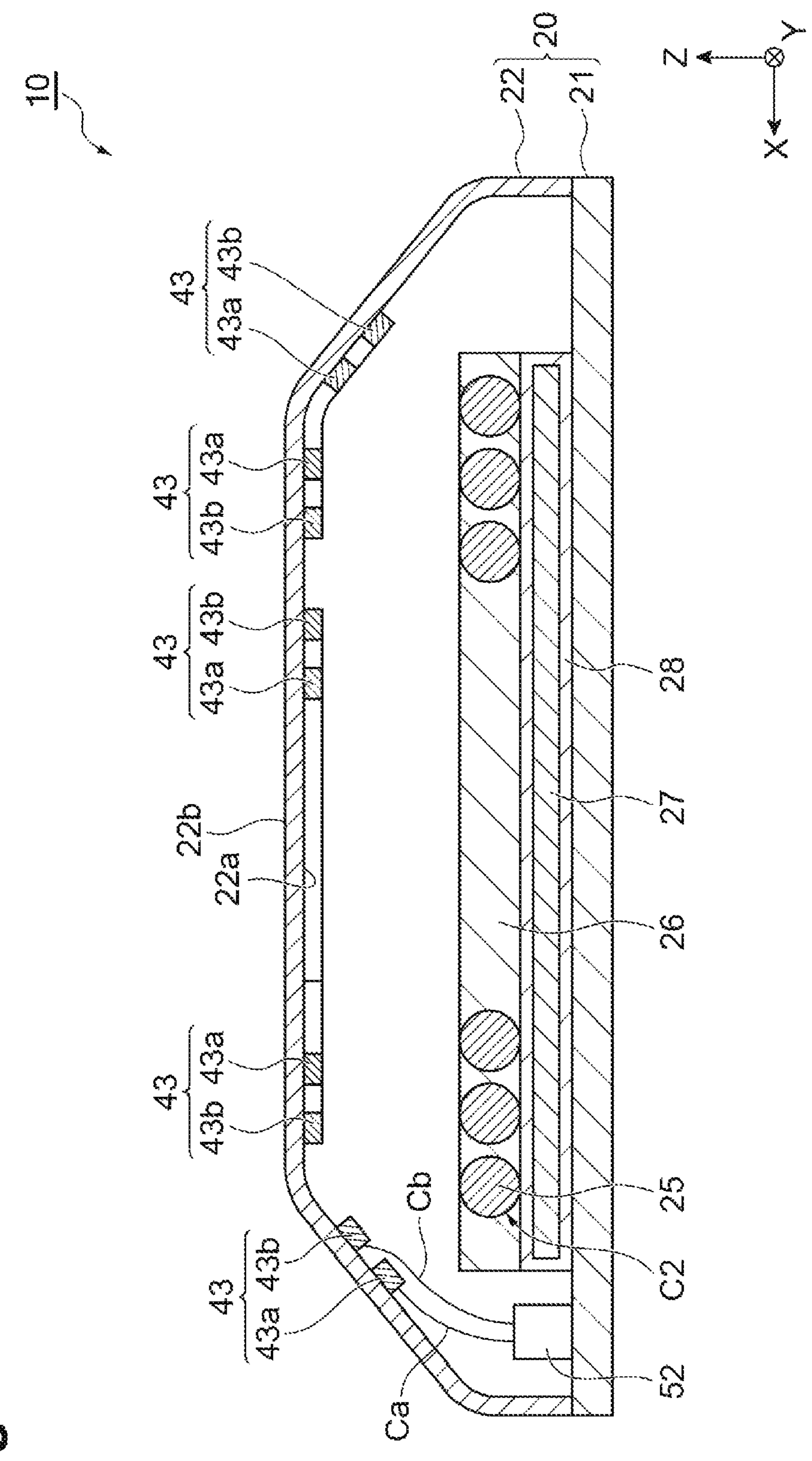
FIG. 3 is a cross-sectional view taken along line shown in FIG. 2.

As shown in FIGS. 2 and 3, the coil device 10 includes a casing 20, the power transmitting coil C2, a conductive part 40, and a detection part 52. The conductive part 40 and the detection part 52 compose a detection device 60. The casing 20 is, for example, a flat box-shaped member, and accommodates at least the power transmitting coil C2. As shown in FIG. 3, the casing 20 has a base 21 and a cover 22 which define an accommodation space for accommodating the power transmitting coil C2.

The base 21 is a plate-shaped member installed on the road surface G. The base 21 may or may not be secured to the road surface G. The power transmitting coil C2 is provided on the base 21. The base 21 faces the cover 22 via the power transmitting coil C2 in the Z direction. The base 21 ensures the general rigidity of the coil device 10. The base 21 can be made of various materials such as a resin material or a metal material as long as the general rigidity of the coil device 10 is ensured. The base 21 may be made to be able to shield magnetic field leakage by making all or a portion of the base 21 from a metal material having low permeability such as aluminum or copper.

The cover 22 is sealingly attached to the base 21 so as to cover the power transmitting coil C2. The space between the base 21 and the cover 22 is sealed, for example, by an O-ring or a sealing member. The cover 22 may be removably attached or non-removably secured to the base 21. The electromagnetic coupling between the power transmitting coil C2 and the power receiving coil C1 is achieved through the cover 22. The cover 22 is thus formed of a non-magnetic and non-electrically conductive material that does not affect the electromagnetic coupling to enable highly efficient wireless power supply. The non-magnetic and non-electrically conductive material is, for example, a resin material such as glass fiber reinforced plastics (GFRP). The cover 22 need not be entirely formed of the non-magnetic and non-electrically conductive material. For example, when the electromagnetic coupling between the power transmitting coil C2 and the power receiving coil C1 is achieved through only a portion of the cover 22, only this portion may be formed of the non-magnetic and non-electrically conductive material. In this case, the other portions of the cover 22 other than this portion may be formed of a material that is not non-magnetic and non-electrically conductive.

The cover 22 has, for example, an opening on a side toward the base 21 in the Z direction, and covers the power transmitting coil C2 on the base 21. An XZ cross-section of the cover 22 is not limited to a trapezoid shape as shown in FIG. 3, and may be of other shapes such as rectangular. The cover 22 includes an inner surface 22*a* that faces the power transmitting coil C2 side, and an outer surface 22*b* that faces a side opposite the power transmitting coil C2. The inner surface 22*a* and the outer surface 22*b* compose the surface of the casing 20. For example, the inner surface 22*a* and the outer surface 22*b* each has a portion parallel to an XY plane, and portions inclined relative to the XY plane. The normal directions of the inner surface 22*a* and the outer surface 22*b* either match the Z direction or have a Z direction component. The cover 22 is formed, for example, of a non-electrically conductive material. Thus, the inner surface 22*a* and the outer surface 22*b* each forms an insulating surface having electrical insulating properties.

The power transmitting coil C2 is formed, for example, of a conductive wire 25 spirally wound in the same plane. The power transmitting coil C2 is, for example, a circular coil. In the circular coil, the conductive wire 25 is wound so as to surround the periphery of a winding axis (coil axis). For example, the winding axis extends in the Z direction, and the winding direction of the conductive wire 25 extends spirally in the XY plane. The power transmitting coil C2 generates a magnetic field by being supplied with electric power from the drive power source 30. Magnetic field lines generated from the power transmitting coil C2 extend toward the power receiving coil C1 and link with the power receiving coil C1. The direction of these magnetic field lines has a Z direction component at the cover 22. The power receiving coil C1 generates an induced current by the magnetic field lines linking with the power receiving coil C1. The power receiving device 11 thus wirelessly receives electric power from the power transmitting device 12.

In the case in which the power transmitting coil C2 is a circular coil, the conductive wire 25 may be single-layered or multi-layered. The power transmitting coil C2 viewed in the Z direction may have various shapes, such as rectangular, circular, or elliptic. For example, a litz wire in which a plurality of conductor strands insulated from each other are twisted together and high frequency resistance is suppressed by a skin effect or a proximity effect, or a copper or aluminum solid wire may be used as the conductive wire 25.

As shown in FIG. 3, the power transmitting coil C2 is, for example, fitted in a groove of a bobbin 26 which is a flat plate-shaped member. The bobbin 26 is formed of a non-magnetic and non-electrically conductive material. For example, silicone or polyphenylene sulfide resin may be used as the material of the bobbin 26. The position of the power transmitting coil C2 inside the casing 20 is determined by the bobbin 26 being secured to the base 21 via a coil holding member 28. The coil holding member 28 is hollow, and a ferrite plate 27 provided between the bobbin 26 and the base 21 is held in a hollow section of the coil holding member 28. The coil holding member 28 is formed, for example, of the same material as the bobbin 26. The ferrite plate 27 is, for example, a rectangular flat plate-shaped ferrite core. The ferrite plate 27 is magnetic, and directs and concentrates the magnetic field lines generated from the power transmitting coil C2.

The drive power source 30 is electrically connected to the power transmitting coil C2. The drive power source 30 supplies electric power, which is necessary to wirelessly supply power to the movable object V, to the power transmitting coil C2. The drive power source 30, for example, receives single phase AC power such as commercial AC power, and converts the single phase AC power into DC power by a rectifier circuit and a smoothing circuit. The drive power source 30 then converts the DC power into high frequency AC power by an inverter circuit, and supplies the high frequency AC power to the power transmitting coil C2. The magnetic field generated from the power transmitting coil C2 with this high frequency AC power is a sinusoidally time-varying AC magnetic field. The high frequency AC power has a frequency of, for example, about 100 kHz, but not limited to this. The high frequency AC power may have a frequency of lower than 100 kHz (for example, 10 kHz), or a frequency of higher than 100 kHz (for example, a few MHz).

The conductive part 40 is provided on the casing 20, and is electrically insulated from the casing 20. The conductive part 40 being electrically insulated from the casing 20 includes both a case in which at least a portion of the casing 20 on which the conductive part 40 is provided is an insulator, and a case in which an insulating member such as an insulating sheet is interposed between the casing 20 and the conductive part 40. In the case in which an insulating member is interposed between the casing 20 and the conductive part 40, the insulating member may be provided on the casing 20 or the conductive part 40.

The conductive part 40 is provided, for example, on the inner surface 22*a* of the cover 22 of the casing 20. A portion of the conductive part 40 may extend to an edge part of the inner surface 22*a* closer to the base 21. The conductive part 40 may be either directly provided on the inner surface 22*a*, or indirectly provided on the inner surface 22*a* via another member. The position at which the conductive part 40 is provided on the casing 20 is not limited.

As illustrated in FIGS. 2 and 3, the conductive part 40 has an input part 41, an output part 42, and a conductive pattern 43. The input part 41 and the output part 42 are portions that are electrically connected to the detection part 52 described later. The conductive pattern 43 is a linear wiring pattern that continues from the input part 41 to the output part 42. The conductive pattern 43 is formed, for example, of an electrically conductive material such as copper or aluminum. The conductive pattern 43 and the detection part 52 form an electrical closed circuit. The conductive pattern 43 may be formed on the inner surface 22*a* by methods such as deposition or adhesion. In the case in which the conductive pattern 43 is formed on the inner surface 22*a* by methods such as deposition or adhesion, the conductive pattern 43 can be closely adhered to the inner surface 22*a*. Thus, when deformation such as fractures or fissures (cracks) occur in the cover 22, cracks or breaks also tend to occur in the conductive pattern 43. The conductive pattern 43 extends so as to meander across the inner surface 22*a* in a predetermined direction. The conductive pattern 43 which extends from the input part 41 turns back at a predetermined position (turn back position RP) of the inner surface 22*a*, and reaches the output part 42. The inner surface 22*a* is a pattern arrangement surface on which the conductive pattern 43 is arranged. In a case in which the conductive pattern 43 is arranged on the outer surface 22*b*, the outer surface 22*b* is the pattern arrangement surface. In a case in which the conductive pattern 43 is arranged on both the inner surface 22*a* and the outer surface 22*b*, both the inner surface 22*a* and the outer surface 22*b* are the pattern arrangement surfaces.

The conductive pattern 43 includes a first portion 43*a* that is connected to the input part 41, and a second portion 43*b* that is connected to the output part 42. The first portion 43*a* and the second portion 43*b* are close to each other. The first portion 43*a* and the second portion 43*b* are arranged side by side, spaced apart by a distance necessary for electrical insulation. The first portion 43*a* extends from the input part 41 to the turn back position RP. The second portion 43*b* extends from the turn back position RP to the output part 42 so as to trace backwards the same path as the path of the first portion 43*a* from the input part 41 to the turn back position RP, spaced apart from the first portion 43*a* by a spacing distance. Thus, when energized, in the portions in which the second portion 43*b* and the first portion 43*a* are close to each other, the electric current in the second portion 43*b* flows in the direction opposite the direction in which the electric current in the first portion 43*a* flows. The first portion 43*a* and the second portion 43*b* are connected to each other via another portion 43*x* of the conductive pattern 43 positioned at the turn back position RP. A width of the second portion 43*b* in a width direction (that is, a direction perpendicular to a direction of extension) may be the same as a width of the first portion 43*a* in the width direction, or may be different from the width of the first portion 43*a*.

The path along which the conductive pattern 43 including the first portion 43*a* and the second portion 43*b* extends meanders such that the conductive pattern 43 is present across the entire inner surface 22*a*. When deformation occurs in an arbitrary position of the cover 22 and the conductive pattern 43 passes through that position, a break or the like may occur in the conductive pattern 43 due to the deformation in the cover 22. In the example illustrated in FIG. 2, the conductive pattern 43 includes portions P1 that extend along the X direction, and portions P2 that extend along the Y direction. The portions P1 that extend along the X direction and the portions P2 that extend along the Y direction are alternately connected.

Figure 4:
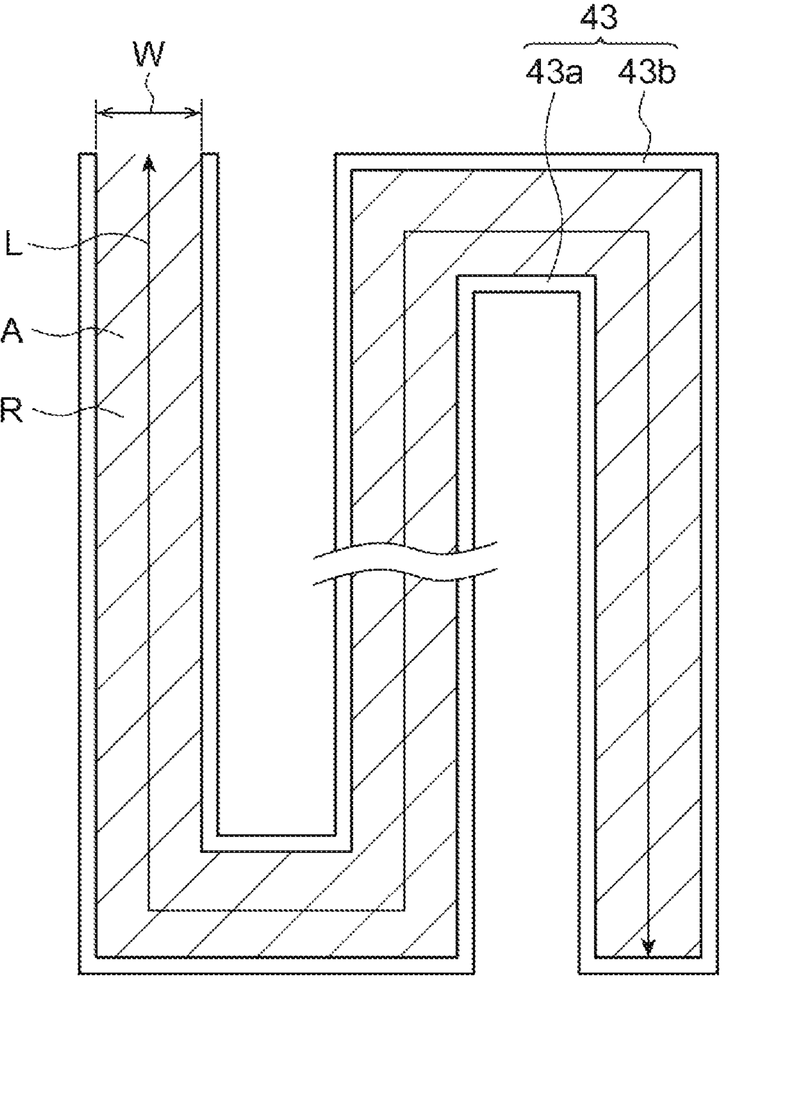
FIG. 4 is a diagram for describing a surface region surrounded by a conductive pattern.

As illustrated in FIG. 4, a distance W between the first portion 43*a* and the second portion 43*b* is minimized to the extent that electrical insulation between the first portion 43*a* and the second portion 43*b* can be secured. Thus, an area A of a surface region R surrounded by the conductive pattern 43 can be minimized. When the high frequency AC power is supplied to the power transmitting coil C2 for wireless power supply, and the magnetic field lines generated from the power transmitting coil C2 link with the surface region R, an induced voltage is generated between the input part 41 and the output part 42. The induced voltage is defined by a product of the area A of the surface region R and a component of the magnetic field in a normal direction of the surface region R. The component of the magnetic field in the normal direction of the surface region R is a resolved component being the magnitude (intensity) of the magnetic field resolved in the normal direction. The area A of the surface region R is, as illustrated in FIG. 4, defined by a product of a length L of the first portion 43*a* or the second portion 43*b* in the direction of extension and the distance W between the first portion 43*a* and the second portion 43*b* in the direction perpendicular to the direction of extension.

Assuming that the magnetic field generated from the power transmitting coil C2 is a spatially homogeneous magnetic field sinusoidally time-varying at a frequency f, this magnetic field H is represented by formula (1) below. In formula (1), C is a constant, and t is time. The component of the magnetic field H in the normal direction of the surface region R is represented by H sin θ, where θ is an angle between the surface region R and the direction of the magnetic field H. Thus, an induced current Ei is represented by a product of the area A of the surface region R and the component H sin θ of the magnetic field H in the normal direction of the surface region R, as per formula (2) below. In this embodiment, the surface region R surrounded by the first portion 43*a* and the second portion 43*b* lies along the XY plane, and the direction of the magnetic field H is generally along the Z direction. Thus, the direction of the magnetic field H is at a right angle to (θ=90°) or at an angle close to a right angle to the surface region R. In such a case in which the direction of the magnetic field H is perpendicular to the surface region R, that is, in the case in which the direction of the magnetic field H is along the normal direction of the surface region R, the induced voltage Ei is defined by a product of the area A of the surface region R and the magnetic field H. On the other hand, in a case in which the direction of the magnetic field H is along the surface region R (θ=0°), that is, in the case in which the direction of the magnetic field H is at a right angle to the normal direction of the surface region R, the induced voltage Ei is 0.

[Formula 1]

$$H = C\sin(2\pi\ ft) \tag{1}$$

[Formula 2]

$$E = A \times H\sin\theta \tag{2}$$

When the induced voltage Ei defined as above is high, the detection part 52 may make false detections as described later. It is thus preferable to adjust the induced voltage Ei to be minimized. To reduce the induced voltage Ei, the area A of the surface region R is reduced, as shown in formula (2). Consequently, arranging the conductive pattern 43 on the inner surface 22*a* such that the area A of the surface region R is small can reduce the likelihood of the detection part 52 making false detections.

To reduce the area A of the surface region R, the length L of the first portion 43*a* and the second portion 43*b* in the direction of extension is reduced, and the distance W between the first portion 43*a* and the second portion 43*b* is reduced. However, reducing the length L of the first portion 43*a* and the second portion 43*b* in the direction of extension will make it difficult to extend the conductive pattern 43 across a large area of the inner surface 22*a*. In this case, deformation in the cover 22 may not be detected when the deformation occurs in a portion of the cover 22 across which the conductive pattern 43 does not extend, since no breaks or the like will occur in the conductive pattern 43. Thus, in this embodiment, the area A of the surface region R is reduced by minimizing the distance W between the first portion 43*a* and the second portion 43*b*.

The detection part 52 is electrically connected to the conductive part 40. The detection part 52 utilizes the conductive part 40 to detect deformation that occurs in the casing 20. As illustrated in FIG. 5, A pair of connection wires Ca and Cb connected to the detection part 52. The connection wire Ca connects a positive terminal of the detection part 52 to the input part 41. The connection wire Cb connects a negative terminal of the detection part 52 to the output part 42.

The detection power source 51 of the power source part 5 supplies electric power to the detection part 52 according to instructions from the control part 53 of the power source part 5. When electric power is supplied from the detection power source 51, electric current flows in the conductive pattern 43 and a voltage is generated between the input part 41 and the output part 42. The electric power may be either direct current or alternating current. When the detection power source 51 is an AC power source, a frequency f1 and a modulation frequency f2 are set so that they are very different from each other, where f1 is the frequency of the AC power source, and f2 is the modulation frequency of the magnetic field that wirelessly supplies power from the power transmitting coil C2 to the power receiving coil C1. Additionally, a filter which has a frequency selectivity that passes a signal of the frequency f1 and prevents the passing of a signal of the modulation frequency f2 is provided in the detection part 52. Accordingly, the impact of the magnetic field that wirelessly supplies power from the power transmitting coil C2 to the power receiving coil C1 on the detection of deformation in the casing 20 based on an energized state of the conductive pattern 43 can be reduced.

The detection power source 51 may be provided inside or outside the casing 20. In the case in which the detection power source 51 is provided outside the casing 20, the detection power source 51 may be positioned close to or away from the casing 20. The detection part 52 is protected from rainwater and the like outside the casing 20 by being provided inside the casing 20. It would also be unnecessary to pass the connection wire Ca and the connection wire Cb through the casing 20. However, the detection part 52 may be provided outside the casing 20, with the connection wire Ca and the connection wire Cb made to pass through the casing 20. Similarly, the control part 53 may be provided inside or outside the casing 20. In the case in which the control part 53 is provided outside the casing 20, the control part 53 may be positioned close to or away from the casing 20.

The detection part 52 is provided, for example, on the base 21, and is operated by electric power being supplied from the detection power source 51. The detection part 52 is electrically connected to one end of each of the pair of connection wires Ca and Cb. The detection part 52 detects deformation that occurs in the casing 20 on the basis of the energized state of the conductive pattern 43. An "energized state" of the conductive pattern 43 is the electrical resistance between the input part 41 and the output part 42 to which the conductive pattern 43 is connected. "Deformation" of the casing 20 includes cracks, fractures, damage, or the like that occurs in the casing 20 that may form a path through which fluid such as water or oil, or gas such as corrosive gas intrudes into the casing 20 from outside.

The detection part 52 includes a measurement part 55, a determination part 57, and a stabilized power source 58. The stabilized power source 58 is provided to operate the measurement part 55 and the determination part 57. The stabilized power source 58 supplies electric power of a constant voltage to the measurement part 55 and the determination part 57. The measurement part 55 includes, for example, a current meter 55*a*, a voltage meter 55*b*, and a calculation part 56. The current meter 55*a* measures a current value flowing in the conductive pattern 43 between the input part 41 and the output part 42. The voltage meter 55*b* measures a voltage value between the input part 41 and the output part 42. The measured current value and voltage value are output to the calculation part 56. In the example illustrated in FIG. 5, the measurement part 55 is composed of the current meter 55*a* and the voltage meter 55*b*, but the configuration of the measurement part 55 is not limited to the example illustrated in FIG. 5, and may vary as appropriate.

The current meter 55*a* measures the current value (Im) that flows through the conductive part 40. The voltage meter 55*b* is connected to the connection wire Ca connected to the input part 41 and the connection wire Cb connected to the output part 42, and measures the voltage value (Vm) between the input part 41 and the output part 42. The calculation part 56 calculates a value obtained by dividing the voltage value Vm by the current value Im, that is, the value of Vm/Im, and outputs the value of Vm/Im to the determination part 57. The value of Vm/Im is equal to the electrical resistance between the input part 41 and the output part 42. An example of the current meter 55*a* includes a current meter that measures the magnetic field generated along with the electric current using a Hall element. An example of the voltage meter 55*b* includes a voltage meter that measures using an A/D converter.

The conductive part 40 is electrically insulated from the casing 20, and the first portion 43*a* and the second portion 43*b* are electrically insulated from each other. Thus, when the detection power source 51 applies a voltage between the input part 41 and the output part 42, an electric current flows along a path of entering from the input part 41, flowing along the first portion 43*a*, passing the turn back position RP, returning along the second portion 43*b*, and exiting from the output part 42. Consequently, short-circuiting between the first portion 43*a* and the second portion 43*b* does not occur. That is, a short circuit current does not flow between the first portion 43*a* and the second portion 43*b*. As such, the electrical resistance of the conductive pattern 43 can be measured by the current meter 55*a* measuring the current value Im that flows in the conductive pattern 43, and the calculation part 56 calculating the value of Vm/Im.

The determination part 57 is composed of a computer including, for example, hardware such as a central processing unit (CPU), a read only memory (ROM), and a random access memory (RAM), and software such as a program stored in the ROM. The determination part 57 determines whether deformation has occurred in the casing 20 by determining whether the energized state of the conductive pattern 43 is abnormal by the electrical resistance output from the calculation part 56. The determination part 57 determines whether the energized state of the conductive pattern 43 is abnormal, for example, by comparing the electrical resistance to a preset threshold. This threshold is reference electrical resistance for determining the energized state of the conductive pattern 43. When the electrical resistance exceeds the threshold, the determination part 57 determines that the energized state of the conductive pattern 43 is abnormal. When the electrical resistance does not exceed the threshold, the determination part 57 determines that the energized state of the conductive pattern 43 is not abnormal.

For example, when the conductive pattern 43 breaks, no electric current flows in the conductive pattern 43, so that the electrical resistance becomes infinite and exceeds the threshold. The electrical resistance may also exceed the threshold in a case in which the conductive pattern 43 is damaged without breaking. The case in which the conductive pattern 43 is damaged without breaking refers is, for example, a case in which a portion of the conductive pattern 43 is torn, a case in which the conductive pattern 43 is stretched and thinned, or the like. In such cases, the cross-sectional area of a damaged portion of the conductive pattern 43 perpendicular to the direction of extension of the conductive pattern 43 is reduced. Accordingly, the electrical resistance may increase and exceed the threshold.

When the electrical resistance exceeds the threshold, the determination part 57 determines that the energized state of the conductive pattern 43 is abnormal, and determines that damage, a break, or the like has occurred in the conductive pattern 43. Since the conductive pattern 43 is formed closely adhered to the inner surface 22*a*, it can be assumed that the damage, break, or the like in the conductive pattern 43 has occurred due to deformation in the cover 22. Thus, when the electrical resistance exceeds the threshold, the determination part 57 determines that deformation has occurred in the casing 20, and outputs a detection signal D1 indicating that deformation has occurred in the casing 20 to the control part 53. When the electrical resistance does not exceed the threshold, the determination part 57 determines that the energized state of the conductive pattern 43 is not abnormal, and determines that no damage, breaks, or the like have occurred in the conductive pattern 43. In this case, the determination part 57 determines that no deformation has occurred in the casing 20.

In a case in which detection by the detection part 52 is performed while the power transmitting coil C2 is transmitting power, the induced voltage Ei generated by the magnetic field lines linking with the surface region R is applied between the input part 41 and the output part 42, in addition to the voltage from the detection power source 51. In this case, the voltage value measured by the voltage meter 55*b* is a value obtained by adding the induced voltage Ei to a voltage Es applied from the detection power source 51, or by subtracting the induced voltage Ei from the voltage Es. The measured electrical resistance is thus offset by (1±Ei/Es) times compared to a case in which the power transmitting coil C2 is not transmitting power. Consequently, when the induced voltage Ei increases, it is difficult for the determination part 57 to accurately compare the electrical resistance according to the voltage applied from the detection power source 51 to the threshold. Thus, as described above, by arranging the conductive pattern 43 on the inner surface 22*a* so that the area A of the surface region R is small, the induced voltage Ei can be reduced. This reduces the impact of the induced voltage Ei on the determination accuracy of the determination part 57, and reduces the likelihood of false detections by the detection part 52.

Rt is threshold electrical resistance, and Rn is the electrical resistance of the conductive part 40 when no deformation has occurred in the casing 20. It is assumed that, when no deformation has occurred in the casing 20, the measured values of the electrical resistance of the conductive part 40 detected by the detection part 52 vary in a range of (Rn−N1) to (Rn+N2) by being affected by the induced voltage Ei when power is transmitted by transmitting coil C2. N1 and N2 indicate error components of the electrical resistance caused by periodic variation of the induced voltage. In this case, in order to satisfy (Rn+N2)<Rt, the induced voltage Ei may be reduced so that N2 is reduced. To achieve this, the conductive pattern 43 may be arranged on the inner surface 22*a* such that the induced voltage Ei is small. N1 and N2 depend, not only on the induced voltage Ei, but also on the circuit structure of the detection part 52. However, once the circuit structure of the detection part 52 is determined, N1 and N2 can be reduced by reducing the induced voltage Ei.

The control part 53 is composed of a computer including, for example, hardware such as a CPU, a ROM, and a RAM, and software such as a program stored in the ROM. The control part 53 controls operations of the detection power source 51 and the drive power source 30, and issues a warning to an administrator 100 who manages the operation state of the coil device 10. The control part 53 is electrically connected to the detection power source 51 and the drive power source 30, and is capable of transmitting and receiving control signals to and from the detection power source 51 and the drive power source 30. The control part 53 may be connected to the detection power source 51 and the drive power source 30 so as to be able to transmit and receive the control signals using a wired, wireless, network communication system, or the like. The control part 53 outputs a control signal D2 to the detection power source 51 to instruct starting or stopping of the power supply from the detection power source 51.

The control part 53 also outputs a control signal D4 to the detection power source 51 to instruct starting or stopping of the power supply from the drive power source 30. Upon receiving the detection signal D1 from the determination part 57, the control part 53 issues a warning D3 to the administrator 100 and outputs the control signal D4 to the drive power source 30 to instruct stopping of the power supply to the power transmitting coil C2. The control part 53 issuing the warning D3 to the administrator 100 upon receiving the detection signal D1 thus enables the administrator 100 to know that deformation has occurred in the casing 20 early on. Accordingly, the administrator 100 is capable of responding quickly such as by replacing the cover 22 or the coil device 10.

When the control part 53 receives the detection signal D1, the control part 53 may perform only one of issuing the warning D3 to the administrator 100, or outputting the control signal D4 to the drive power source 30 to instruct stopping of the power supply to the power transmitting coil C2. In a case in which a plurality of the coil devices 10 is used for the wireless power supply system 1, the control part 53 may issue warnings having identification (ID) numbers to the administrator 100 to identify the coil devices 10. This enables the administrator 100 to recognize from which coil device 10 the warning was issued.

A detection method by the detection part 52 will now be described with reference to FIGS. 6 and 7. The example illustrated in FIG. 6 mainly considers the situation in which detection by the detection part 52 is performed while power is being supplied to the power transmitting coil C2. The example illustrated in FIG. 7 considers the situation in which detection by the detection part 52 is performed before power is supplied to the power transmitting coil C2. The example illustrated in FIG. 6 is described first.

Figure 6:
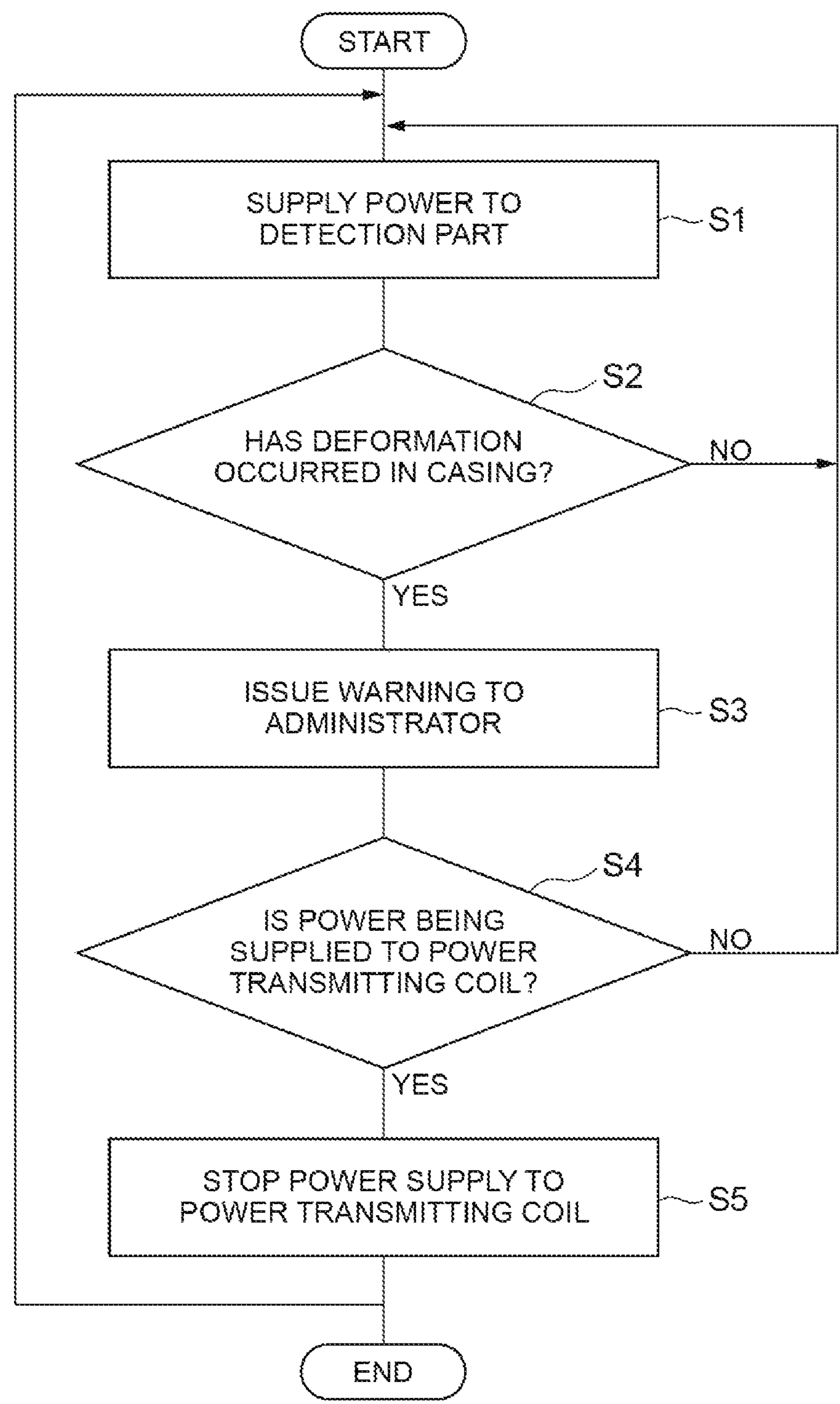
FIG. 6 is an example of a flow chart illustrating a detection method of the detection part.

As illustrated in FIG. 6, the detection power source 51 supplies electric power to the detection part 52 according to the control signal D2 (step S1). The conductive pattern 43 is thus energized. The determination part 57 then determines whether there is deformation in the casing 20 on the basis of the energized state of the conductive pattern 43 (step S2). Specifically, the measurement part 55 measures the electrical resistance between the input part 41 and the output part 42, and the determination part 57 determines whether that electrical resistance exceeds the threshold. If the determination part 57 determines that the electrical resistance does not exceed the threshold, the determination part 57 determines that no deformation has occurred in the casing 20 (No in step S2). In this case, steps S1 and S2 are repeated.

If the determination part 57 determines that the electrical resistance exceeds the threshold, the determination part 57 determines that deformation has occurred in the casing 20 (Yes in step S2). In this case, the determination part 57 outputs the detection signal D1 indicating that deformation has occurred in the casing 20 to the control part 53. Upon receiving the detection signal D1, the control part 53 issues the warning D3 to the administrator 100 (step S3). The control part 53 then checks whether the drive power source 30 is supplying electric power to the power transmitting coil C2 (step S4). If the drive power source 30 is not supplying electric power to the power transmitting coil C2 (No in step S4), steps S1, S2, S3, and S4 are repeated. If, however, the drive power source 30 is supplying electric power to the power transmitting coil C2 (Yes in step S4), the control part 53 outputs the control signal D4 to the drive power source 30 to instruct stopping of the power supply to the power transmitting coil C2, and the drive power source 30 stops the power supply to the power transmitting coil C2 upon receiving the control signal D4 (step S5).

Figure 7:
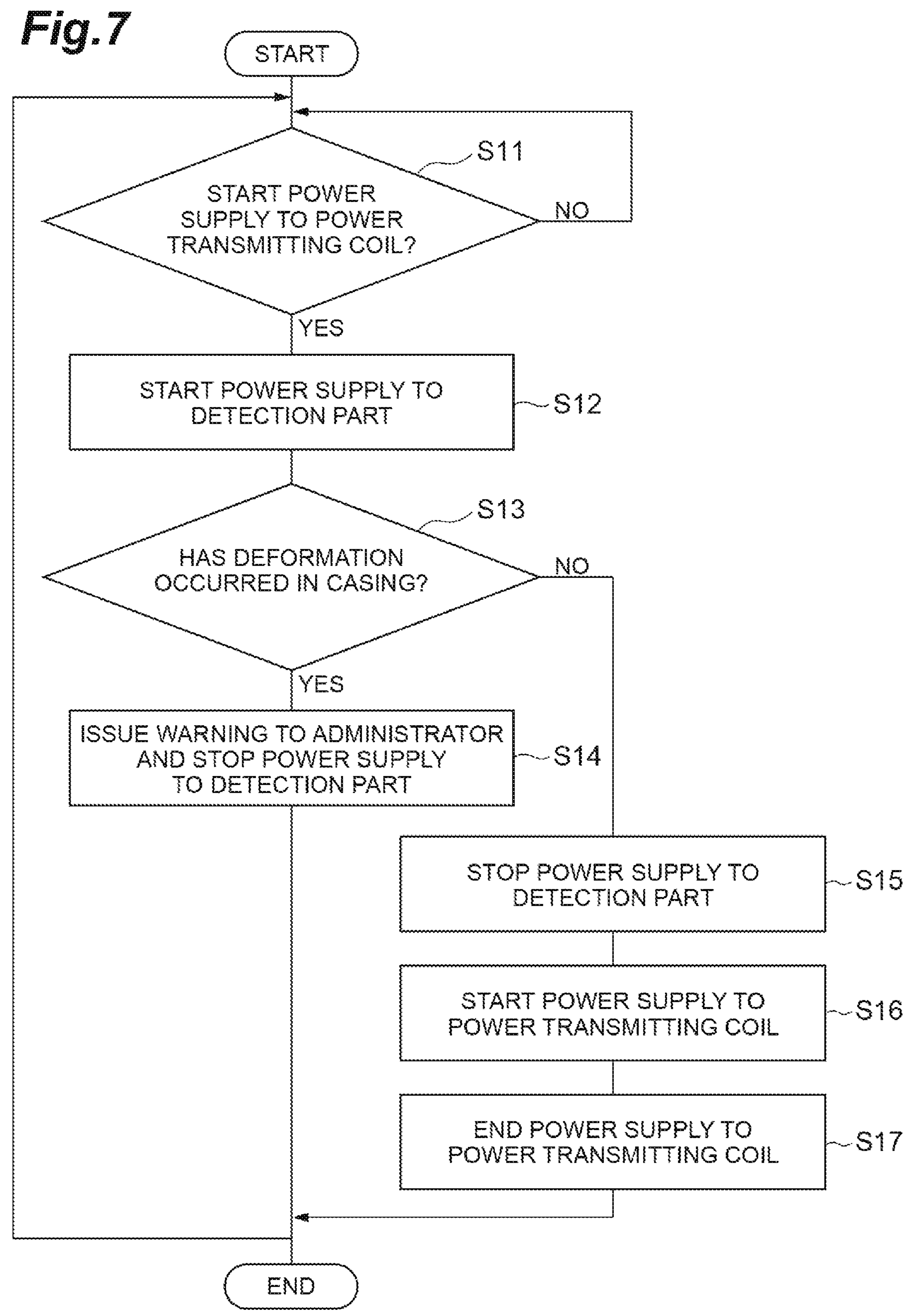
FIG. 7 is another example of the flow chart illustrating the detection method of the detection part.

The example illustrated in FIG. 7 is described next. In this example, the control part 53 checks whether the drive power source 30 will start the power supply to the power transmitting coil C2 (step S11). If the drive power source 30 will not start the power supply to the power transmitting coil C2 (No in step S11), step S11 is repeated. If, however, the drive power source 30 is about to start the power supply to the power transmitting coil C2 (Yes in step S11), the control part 53 outputs the control signal D2 to the detection power source 51 to instruct starting of the power supply to the detection part 52. The detection power source 51 starts the power supply to the detection part 52 upon receiving the control signal D2 (step S12). The conductive pattern 43 is thus energized.

The determination part 57 then determines whether deformation has occurred in the casing 20 on the basis of the energized state of the conductive pattern 43 (step S13). Specifically, the measurement part 55 measures the electrical resistance between the input part 41 and the output part 42, and the determination part 57 determines whether that electrical resistance exceeds the threshold. If the determination part 57 determines that the electrical resistance does not exceed the threshold, the determination part 57 determines that no deformation has occurred in the casing 20 (No in step S13). In this case, the control part 53 outputs the control signal D2 to the detection power source 51 to instruct stopping of the power supply to the detection part 52. The detection power source 51 stops the power supply to the detection part 52 upon receiving the control signal D2 (step S15).

The control part 53 then outputs the control signal D4 to the drive power source 30 to start the power supply to the power transmitting coil C2, and the drive power source 30 starts the power supply to the power transmitting coil C2 upon receiving the control signal D4 (step S16). When an event occurs indicating that the power supply should be stopped, such as when the battery of the vehicle is fully charged or when a predetermined charging time has passed, the control part 53 outputs the control signal D4 to the drive power source 30 to stop the power supply to the power transmitting coil C2. The detection power source 30 stops the power supply to the power transmitting coil C2 upon receiving the control signal D4 (step S17). If, however, the determination part 57 determines that the electrical resistance exceeds the threshold, the determination part 57 determines that deformation has occurred in the casing 20 (Yes in step S13). In this case, the determination part 57 outputs the detection signal D1 indicating that deformation has occurred in the casing 20 to the control part 53. Upon receiving the detection signal D1, the control part 53 issues the warning D3 to the administrator 100. The control part 53 also outputs the control signal D2 to the detection power source 51 to instruct stopping of the power supply to the detection part 52. Upon receiving the control signal D2, the detection power source 51 stops the power supply to the detection part 52 (step S14). The process returns to step S11 without starting the power supply to the power transmitting coil C2.

In the example illustrated in FIG. 7, the detection by the detection part 52 is performed before starting the power supply to the power transmitting coil C2, so that it is unnecessary to continually supply power from the detection power source 51 to the detection part 52 to perform the detection by the detection part 52. Power consumption required to supply power from the detection power source 51 to the detection part 52 can thus be reduced.

The operation and effects obtained by the coil device 10 and the detection device 60 described above will be described. In the coil device 10 and the detection device 60, the detection part 52 energizes the conductive pattern 43 of the conductive part 40 provided on the casing 20. When damage or a break occurs in the conductive pattern 43 in this state, the energized state of the conductive pattern 43 becomes abnormal. For example, when the conductive pattern 43 breaks, no electric current will flow in the conductive pattern 43, and the electrical resistance between the input part 41 and the output part 42 will be infinite. Alternatively, when the conductive pattern 43 is stretched and thinned, the electrical resistance between the input part 41 and the output part 42 will increase. In such cases, since the casing 20 and the conductive pattern 43 are closely adhered, deformation in the casing 20 and a break in the conductive pattern 43 will occur at the same time, and thus it is likely that deformation such as damage or a crack has occurred in the casing 20. Accordingly, the detection part 52 detects the deformation in the casing 20 on the basis of the energized state of the conductive pattern 43. That is, the detection part 52 detects whether deformation has occurred in the casing 20 by detecting the electrical resistance between the input part 41 and the output part 42. If deformation in the casing 20 can be detected, actions such as stopping the operation of the coil device 10 can be taken. Thus, situations in which the coil device 10 is operated in a state in which deformation has occurred in the casing 20, that is, in a state in which performance may be degraded can be suppressed. As a result, situations in which the power transmission by the power transmitting coil C2 is unstable can be suppressed.

The conductive pattern 43 extends so as to meander across the entire inner surface 22*a*. Thus, no matter what position the deformation occurs in the cover 22, the conductive pattern 43 will be present in that position, so that damage or breaks in the conductive pattern 43 will more reliably occur with the deformation in the cover 22. As a result, the detection of the deformation in the cover 22 based on the energized state of the conductive pattern 43 can be more reliably performed. That is, situations in which the deformation in the cover 22 fails to be detected by relying on the position at which the deformation occurs in the cover 22 can be suppressed.

The conductive part 40 is electrically insulated from the casing 20, and the first portion 43*a* and the second portion 43*b* are electrically insulated from each other. Thus, when electric power is supplied between the input part 41 and the output part 42, electric current flows along the direction of extension of the conductive pattern 43. That is, a short circuit current does not flow between the first portion 43*a* and the second portion 43*b*. Consequently, the electrical resistance of the conductive pattern 43 can be correctly measured by the voltage meter 55*b* measuring the voltage value Vm between the input part 41 and the output part 42, the current meter 55*a* measuring the current value Im that flows in the conductive pattern 43, and the calculation part 56 calculating the value of Vm/Im.

In the coil device 10, the conductive pattern 43 includes the first portion 43*a* and the second portion 43*b* arranged side by side on the inner surface 22*a*, and the electric currents in the first portion 43*a* and in the second portion 43*b* flow in opposite directions when energized. This configuration enables an increase in the area A of the surface region R surrounded by the first portion 43*a* and the second portion 43*b* to be suppressed. As described above, the induced voltage Ei generated by the magnetic field linking with the surface region R is defined by the product of the component of the magnetic field in the normal direction of the surface region R and the area A of the surface region R. An increase in the induced voltage Ei can thus be suppressed by suppressing the increase in the area A of the surface region R. By suppressing the increase in the induced voltage Ei in this manner, the impact of the induced voltage Ei on the accuracy of electrical resistance measurement of the conductive part 40 by the detection part 52 can be suppressed. This reduces the likelihood of false detections by the detection part 52 caused by the generation of the induced voltage Ei. Although a magnetic field that electromagnetically couples the power transmitting coil C2 and the power receiving coil C1 is generated with the wireless power supply, the likelihood of false detections by the detection part 52 can also be reduced during the wireless power supply.

In the coil device 10, the second portion 43*b* of the conductive pattern 43 is arranged side by side with the first portion 43*a* along directions intersecting the normal direction of the inner surface 22*a* (that is, the X direction and the Y direction), and extends along the direction of extension of the first portion 43*a*. This configuration enables the increase in the area A of the surface region R of the conductive pattern 43 surrounded by the first portion 43*a* and the second portion 43*b* to be effectively suppressed. Accordingly, the increase in the induced voltage Ei can be effectively suppressed. By suppressing the increase in the induced voltage Ei in this manner, the impact of the induced voltage Ei on the accuracy of electrical resistance measurement of the conductive part 40 by the detection part 52 can be effectively suppressed. This further reduces the likelihood of false detections by the detection part 52 caused by the generation of the induced voltage Ei.

In the coil device 10, the conductive pattern 43 includes portions P1 that extend along the X direction, and portions P2 that extend along the Y direction. This configuration enables the detection part 52 to detect the deformation in the casing 20 using the portions P1 of the conductive pattern 43 when damage or cracks occur on the inner surface 22*a* in the Y direction. When damage or cracks occur on the inner surface 22*a* in the X direction, the detection part 52 can detect the deformation in the casing 20 using the portions P2 of the conductive pattern 43. The detection part 52 can thus more reliably detect the deformation in the casing 20 on the basis of the energized state of the conductive pattern 43 regardless of whether the damage or cracks occur on the inner surface 22*a* in the X direction or the Y direction.

In the coil device 10, the conductive part 40 is provided on the inner surface 22*a* of the cover 22. Thus, situations in which the conductive part 40 degrades due to exposure to rainwater and the like can be avoided. Additionally, since the conductive part 40 is provided on the inner surface 22*a* of the casing 20, by providing the detection part 52 inside the casing 20, the conductive part 40 and the detection part 52 can be electrically connected without forming a through hole in the casing 20. Situations in which the seal of the casing 20 fails can thus be suppressed. As a result, situations in which the coil device 10 is operated in a state in which performance may be degraded can be more reliably suppressed, and situations in which the power transmission by the power transmitting coil C2 is unstable can be more reliably suppressed.

In the power supply device 2, the control part 53 of the power source part 5 stops the power supply to the power transmitting coil C2 when the detection part 52 detects deformation. According to this configuration, situations in which the coil device 10 is operated in a state in which deformation has occurred in the casing 20, that is, in a state in which performance may be degraded can be more reliably suppressed. Thus, situations in which the power transmission by the power transmitting coil C2 is unstable can be more reliably suppressed.

Figure 8:
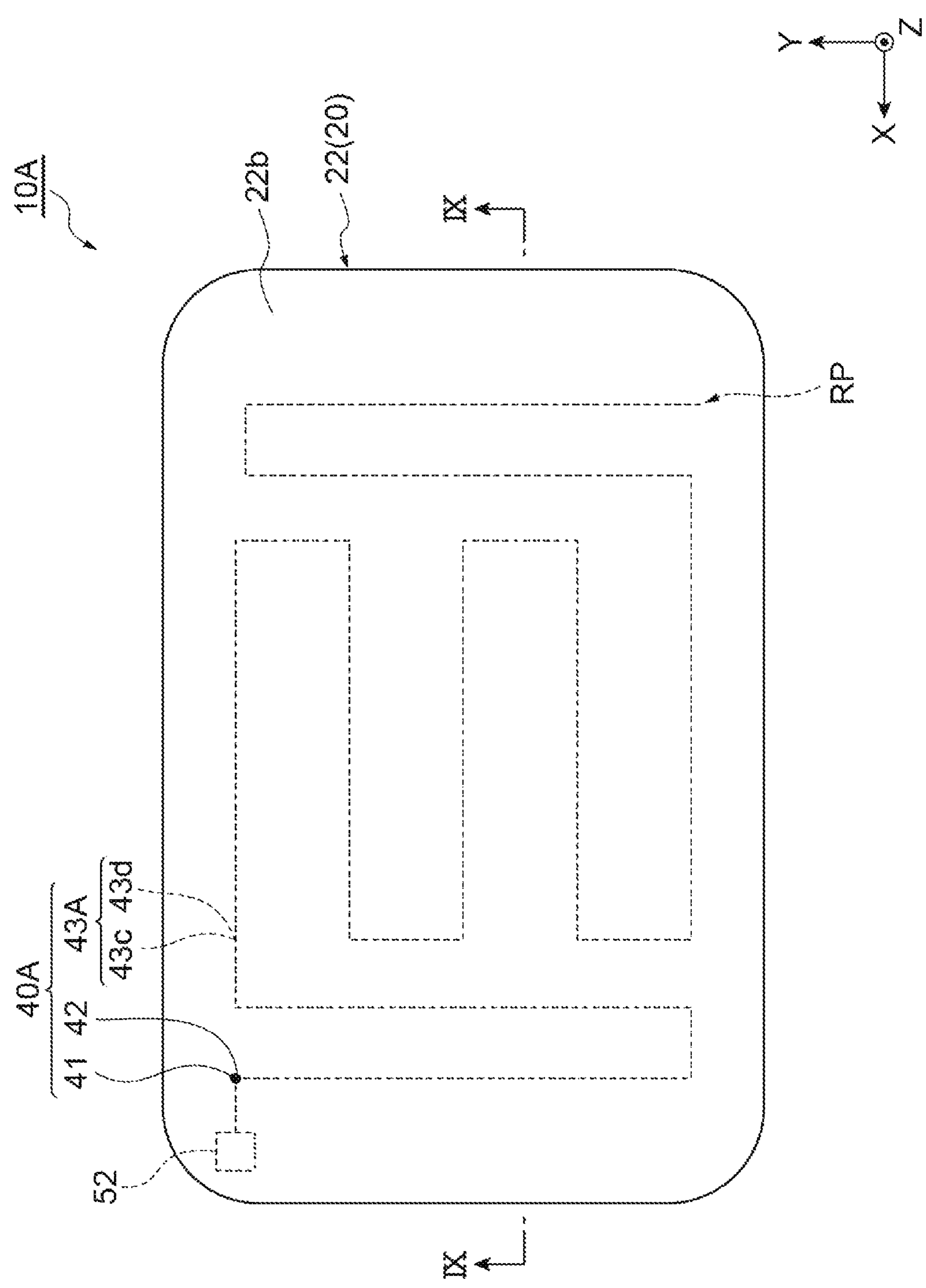
FIG. 8 is a top view illustrating a first variation of the coil device.
Figure 9:
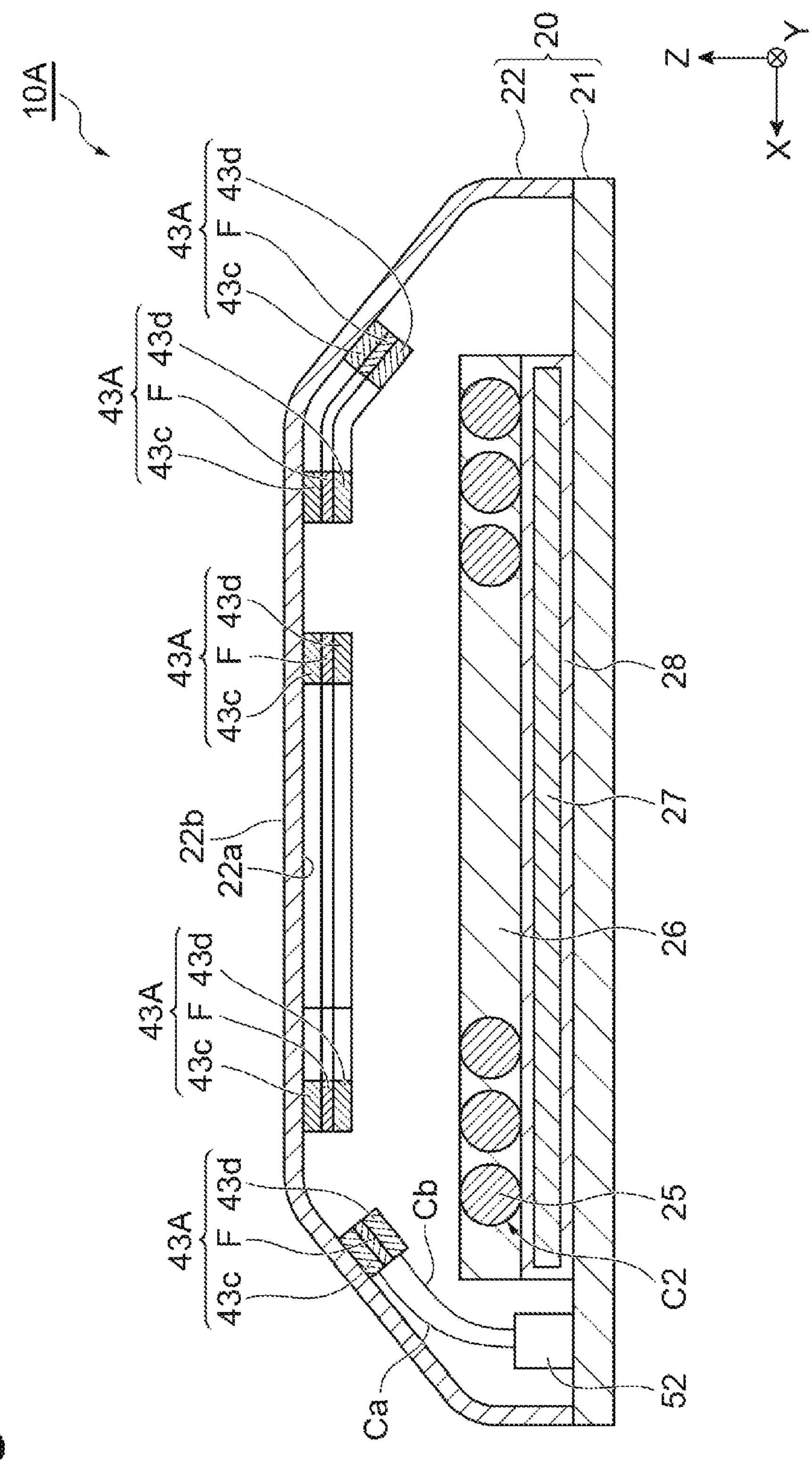
FIG. 9 is a cross-sectional view taken along line IX-IX shown in FIG. 8.

Although one embodiment of the present disclosure has been described above, the present disclosure is not limited thereto. FIGS. 8 and 9 illustrate a first variation of the coil device 10. The difference between a coil device 10A according to this variation and the coil device 10 according to the embodiment above is the arrangement relation of the first portion and the second portion of the conductive pattern. In a conductive part 40A of the coil device 10A, a second portion 43*d* of a conductive pattern 43A is arranged side by side with and spaced apart from a first portion 43*c* along the Z direction, and extends so as to overlap the first portion 43*c* when viewed in the Z direction.

The second portion 43*d* is arranged on a side of the first portion 43*c* closer to the power transmitting coil C2 in the Z direction. An insulating member F such as an insulating film is interposed between the first portion 43*c* and the second portion 43*d*. The first portion 43*c* and the second portion 43*d* are electrically insulated by the insulating member F. In such a case in which the first portion 43*c* and the second portion 43*d* are arranged overlapping each other in the Z direction, the normal direction of the surface region R (see FIG. 4) surrounded by the conductive pattern 43A is perpendicular to the direction of extension of the magnetic field lines.

The induced current Ei generated between the input part 41 and the output part 42 by the magnetic field lines linking with the surface region R is defined as the product of the area A of the surface region R and the component H sin θ of the magnetic field H in the normal direction of the surface region R. Thus, in the case in which the normal direction of the surface region R is perpendicular to the direction of extension of the magnetic field lines, the component H sin θ of the magnetic field H in the normal direction of the surface region R is 0, and the induced voltage Ei is also 0. The configuration of the coil device 10A enables the normal direction of the surface region R surrounded by the conductive pattern 43A to be substantially at a right angle to the direction of the magnetic field H, so that the induced voltage Ei can be closer to 0. The coil device 10A thus even further reduces the likelihood of false detections by the detection part 52 caused by the generation of the induced voltage Ei. Additionally, the first portion 43*c* is closely adhered to the casing 20. Consequently, similarly to the coil device 10, when deformation occurs in the casing 20, a break will also occur in the first portion 43*c*, so that the deformation in the casing 20 can be detected from a conductive state of the conductive pattern 43A. The first portion 43*c* and the second portion 43*d* may be arranged interchanged with each other. In this case, the second portion 43*d* will be closely adhered to the casing 20 (specifically, the inner surface 22*a* of the cover 22), and the first portion 43*c* will be arranged on a side of the second portion 43*d* closer to the power transmitting coil C2 in the Z direction. Although FIG. 9 illustrates an example in which the thickness of the insulating member F is uniform, the thickness of the insulating member F may vary by location as long as the first portion 43c and the second portion 43d are electrically insulated.

Figure 10:
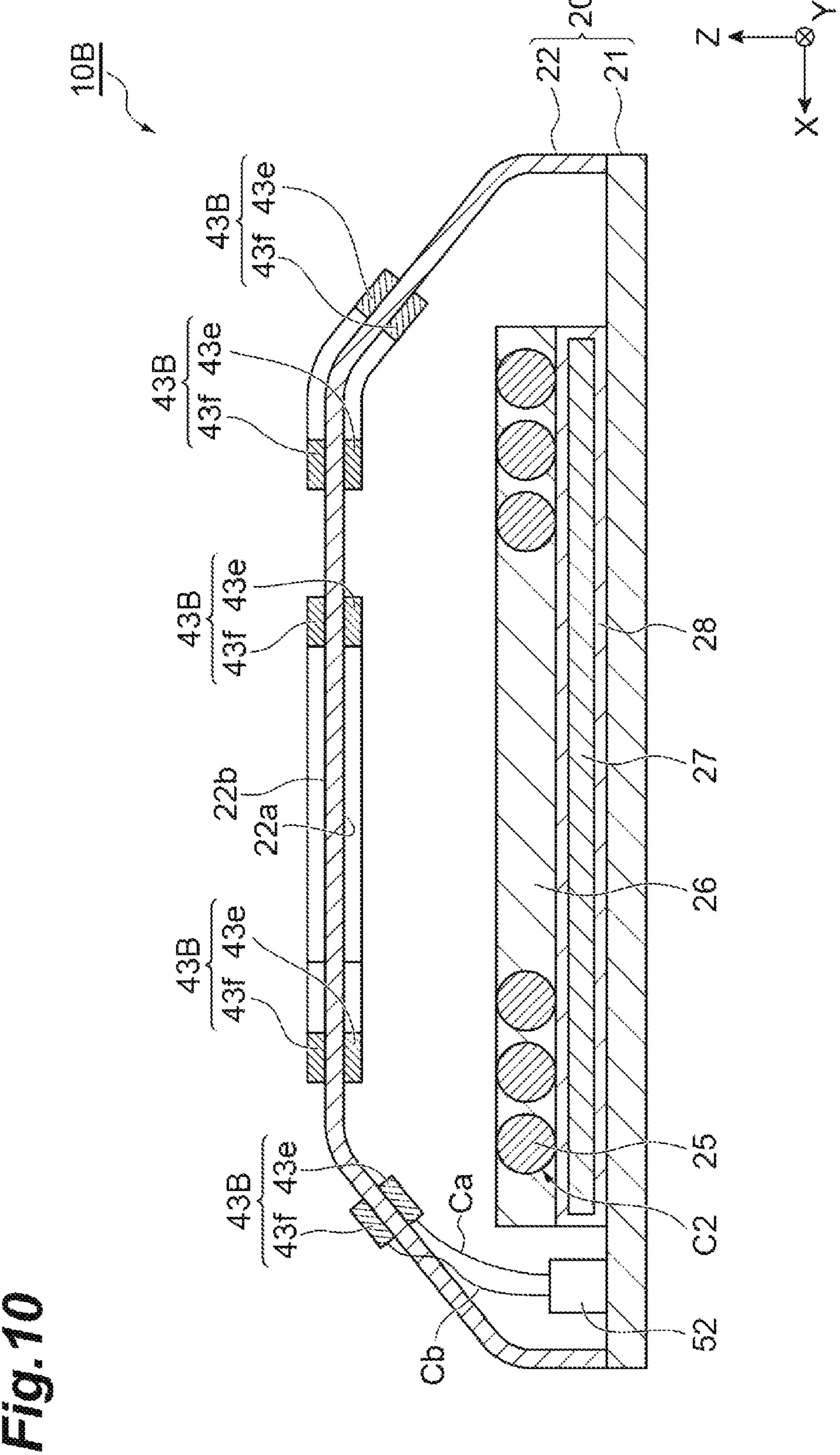
FIG. 10 is a cross-sectional view illustrating a second variation of the coil device.

FIG. 10 illustrates a second variation of the coil device 10. In a coil device 10B according to this variation, similarly to the coil device 10A, a second portion 43f of a conductive pattern 43B is aligned spaced from a first portion 43e along the Z direction. However, the coil device 10B is different from the coil device 10A in that the second portion 43f is provided on the outer surface 22b. As illustrated in FIG. 10, in the case in which the second portion 43f is provided on the outer surface 22b, the second portion 43f may be exposed to rainwater and the like. Thus, to suppress the degradation of the second portion 43f due to contact with rainwater and the like, the second portion 43f may be covered from above by a waterproof film. The aspect of the coil device 10B according to this variation also achieves the configuration in which the second portion 43f overlaps the first portion 43e in the Z direction, so that the same effects as those of the coil device 10A can be obtained.

In the coil device 10B, it is necessary to form a through hole in the cover 22 for forming a via to electrically connect the first portion 43e to the second portion 43f. For example, a through hole penetrating in the Z direction may be formed in the cover 22 at the turn back position RP (see FIG. 8) of the conductive pattern 43B, and a via formed of an electrically conductive material may be provided inside the through hole. The first portion 43e provided on the inner surface 22a can be electrically connected to the second portion 43f provided on the outer surface 22b by forming such a via. The connection wire Cb connected to the second portion 43f is connected to the detection part 52 inside the casing 20, for example, through the through hole formed in the cover 22. In a case in which the detection part 52 is formed outside the casing 20, instead of forming a though hole to pass the connection wire Cb connected to the second portion 43f therethrough, a different through hole may be formed in the cover 22 so that the connection wire Ca connected to the first portion 43e is connected to the detection part 52 therethrough. The first portion 43e and the second portion 43f may be arranged interchanged with each other. That is, the first portion 43e may be arranged on the outer surface 22b, and the second portion 43f may be arranged on the inner surface 22a.

Figure 11:
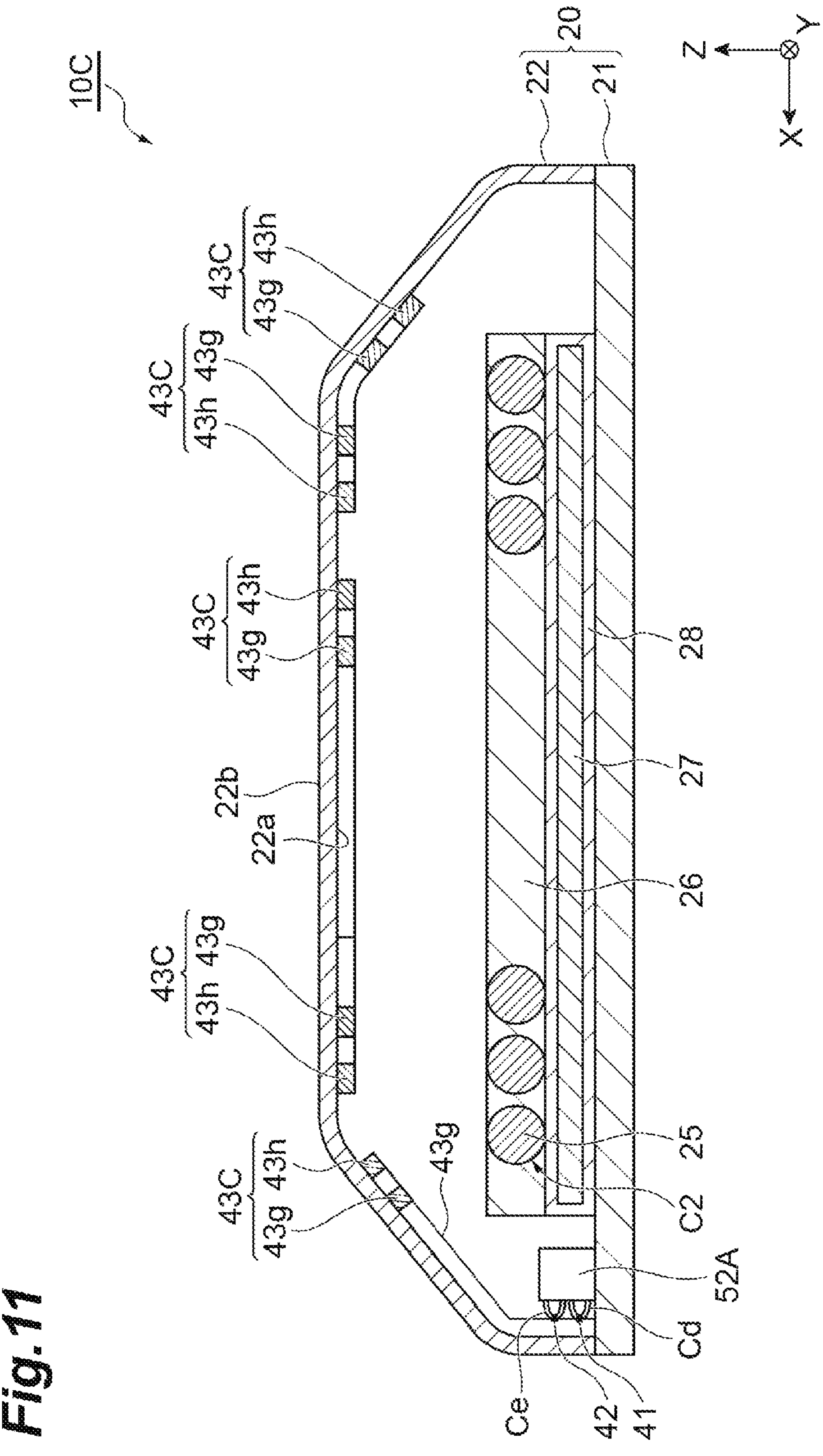
FIG. 11 is a cross-sectional view illustrating a third variation of the coil device.
Figure 12:
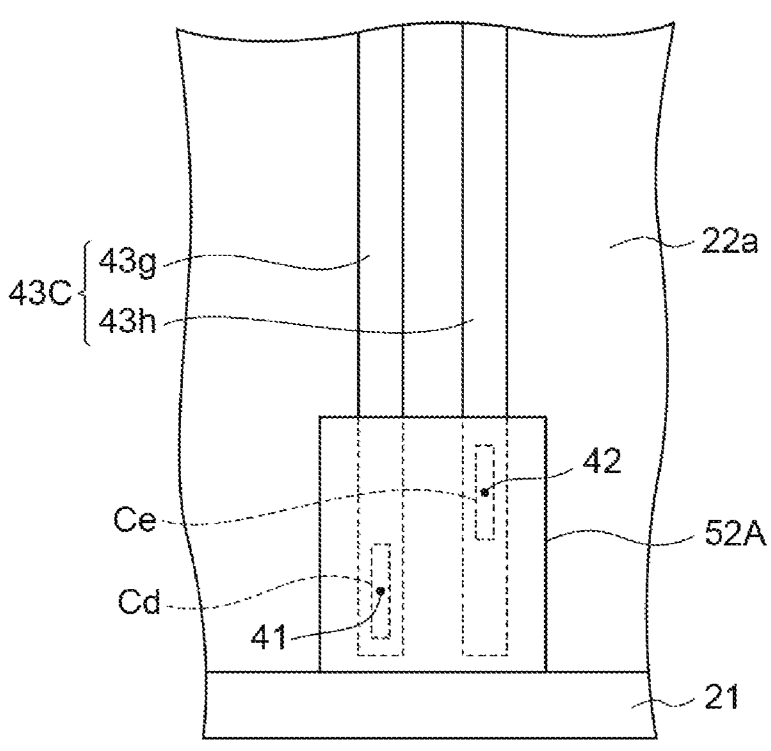
FIG. 12 is a diagram of an inner surface of a cover seen from the detection part side of the coil device illustrated in FIG. 11.
Figure 12:
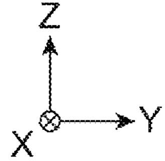

FIGS. 11 and 12 illustrate a third variation of the coil device 10. In a coil device 10C according to this variation, unlike the coil device 10, a first portion 43g and a second portion 43h of a conductive pattern 43C extend to an edge part of the inner surface 22a closer to the base 21. As illustrated in FIG. 12, the first portion 43g and the second portion 43h are arranged side by side along the Y direction on the inner surface 22a, and extend along the Z direction toward the base 21. In the coil device 10C, the cover 22 is removably attached to the base 21.

In the coil device 10C, a detection part 52A has a pair of connection parts Cd and Ce. Each of the connection parts Cd and Ce is, for example, a spring-like metal terminal projecting from the detection part 52A toward the inner surface 22a. The connection parts Cd and Ce contact the first portion 43g and the second portion 43h, respectively, by spring pressure. The connection parts Cd and Ce are thus electrically connected to the first portion 43g and the second portion 43h, respectively. A contact between the connection part Cd and the first portion 43g is the input part 41, and a contact between the connection part Ce and the second portion 43h is the output part 42. Additionally, the connection parts Cd and Ce are electrically connected to a positive terminal and a negative terminal, respectively, of the detection power source 51.

The connection parts Cd and Ce are electrically connected to the input part 41 and the output part 42, respectively, by the cover 22 being attached to the base 21. Specifically, when the cover 22 is attached to the base 21, the connection parts Cd and Ce contact the first portion 43g and the second portion 43h, respectively. The connection parts Cd and Ce are thus electrically connected to the input part 41 and the output part 42, respectively. When the cover 22 is removed from the base 21, the respective contacts between the connection parts Cd and Ce and the first portion 43g and the second portion 43h are released. The connection parts Cd and Ce are thus electrically disconnected from the input part 41 and the output part 42, respectively.

When deformation occurs in the cover 22 of the casing 20, the cover 22 in which the deformation has occurred may be removed, and a new cover 22 with no deformation may be attached to the base 21. In the coil device 10C, the pair of connection parts Cd and Ce are electrically connected to the input part 41 and the output part 42, respectively, by the cover 22 being attached to the base 21. This facilitates connecting of the detection part 52A to the conductive pattern 43C when attaching a new cover 22 to the base 21.

Figure 13:
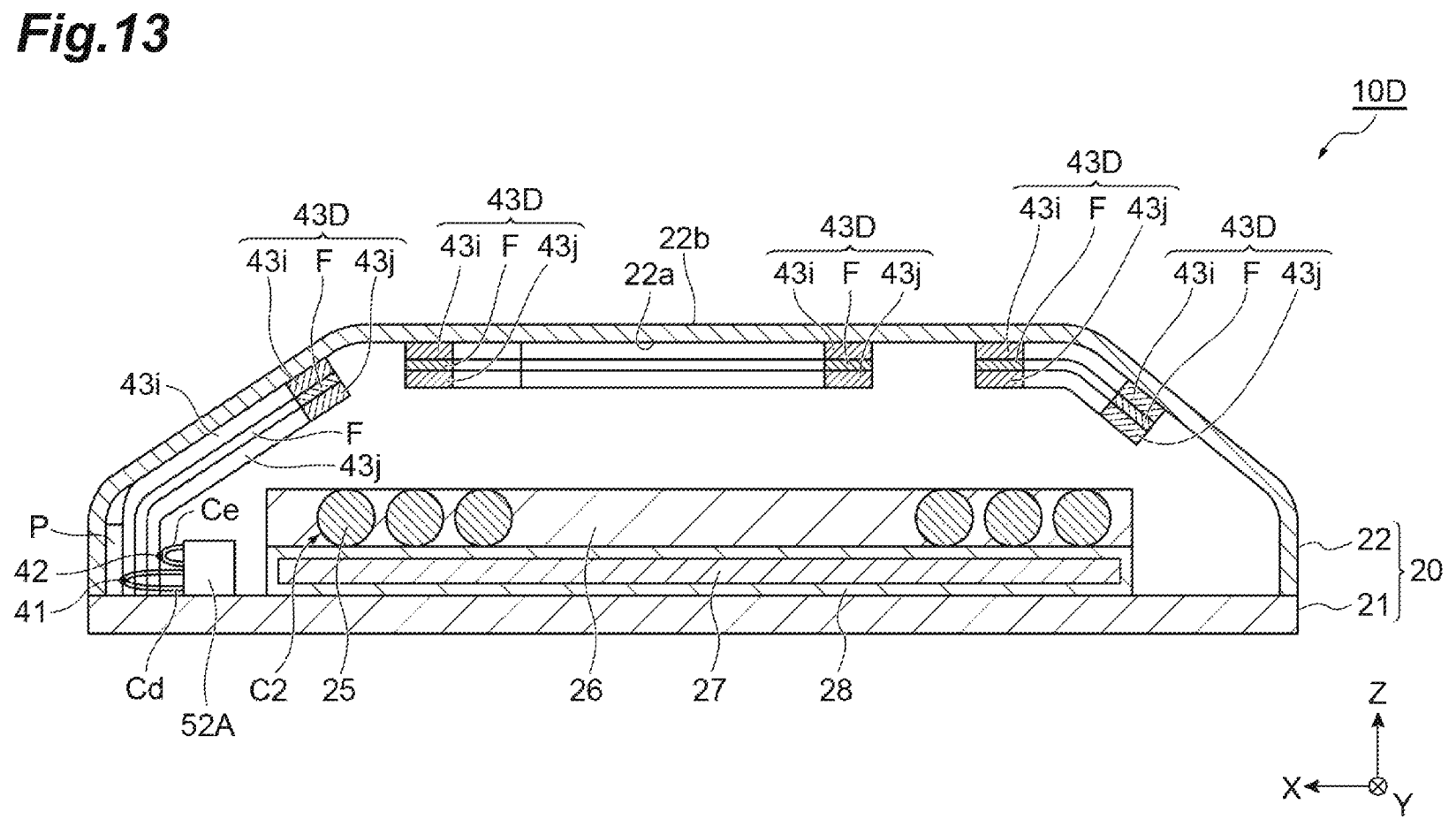
Figure 14:
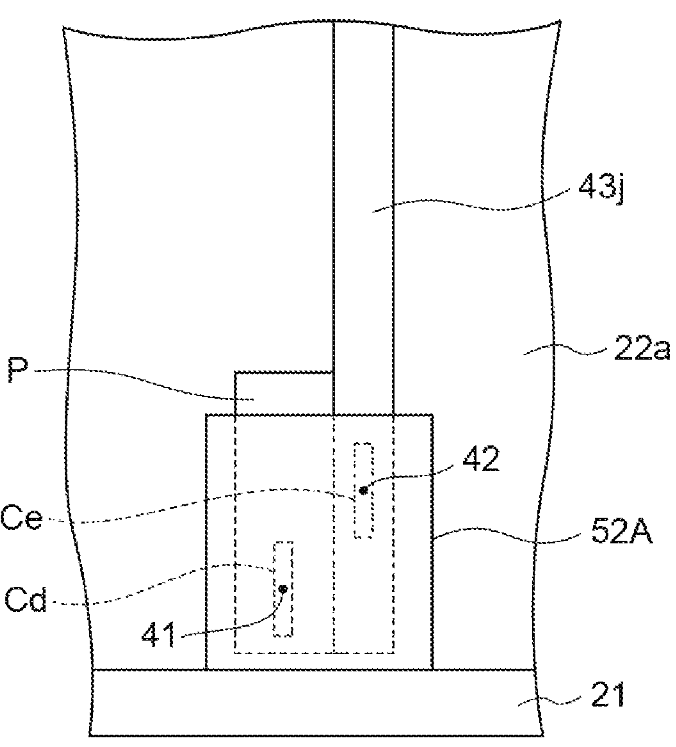
FIG. 14 is a diagram of the inner surface of the cover seen from the detection part side of the coil device illustrated in FIG. 13.
Figure 14:
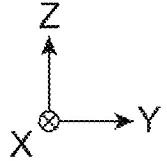

FIGS. 13 and 14 illustrate a fourth variation of the coil device 10. A coil device 10D according to this variation has a configuration in which the configuration of the coil device 10A illustrated in FIGS. 8 and 9 is combined with the configuration of the coil device 10C illustrated in FIGS. 11 and 12. In the coil device 10D, a first portion 43i, the insulating member F, and a second portion 43j extend to the edge part of the inner surface 22a closer to the base 21. As illustrated in FIGS. 13 and 14, in the coil device 10D, an electrical conductor P such as a metal film is interposed between the inner surface 22a and the first portion 43i. The electrical conductor P is formed, for example, of a metal material such as copper or aluminum. The electrical conductor P is provided in contact with the inner surface 22a. The electrical conductor P is also in contact with the first portion 43i, and is electrically connected to the first portion 43i.

As illustrated in FIG. 14, the electrical conductor P extends in the Y direction from a region between the inner surface 22a and the first portion 43i in the X direction. The connection part Cd of the detection part 52A is electrically connected to the first portion 43i via the electrical conductor P by the connection part Cd contacting an extended portion of the electrical conductor P. Additionally, the connection part Ce is electrically connected to the second portion 43j by contacting the second portion 43j. This aspect enables the effects of both the coil device 10A and the coil device 10C described above to be obtained.

Figure 15:
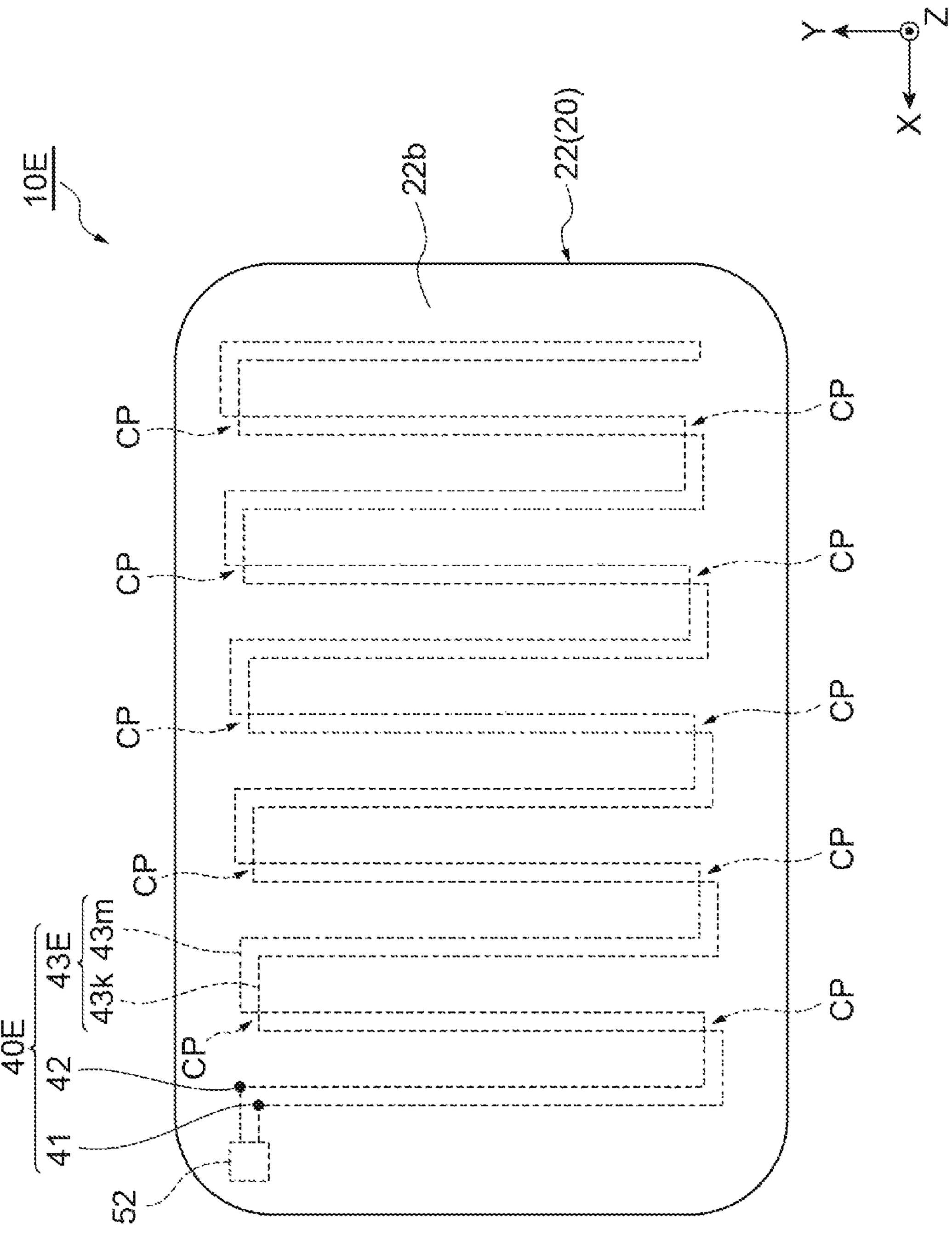
FIG. 15 is a top view illustrating a fifth variation of the coil device.
Figure 16:
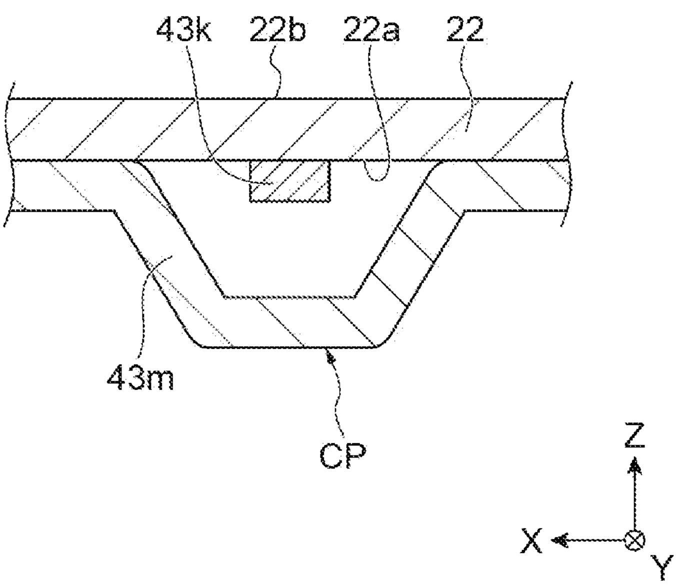
FIG. 16 is a cross-sectional view illustrating a crossing portion of the coil device illustrated in FIG. 15.

FIG. 15 illustrates a fifth variation of the coil device 10. Unlike the conductive part 40 of the coil device 10 according to the embodiment above, a conductive part 40E of a coil device 10E according to this variation includes a crossing portion CP in which a second portion 43m of a conductive pattern 43E three-dimensionally crosses a first portion 43k. FIG. 16 illustrates an XZ cross-section of the crossing portion CP. As illustrated in FIG. 16, the crossing portion CP is arranged side by side with and spaced from the first portion 43k in the Z direction, and crosses the first portion 43k when viewed in the Z direction. The crossing portion CP and the first portion 43k may be insulated by being spaced from each other, or by an insulating member such as an insulating sheet being interposed between the crossing portion CP and the first portion 43*k*. The other portions of the second portion 43*m* other than the crossing portion CP are arranged side by side with the first portion 43*k* along directions intersecting the Z direction (the X direction and the Y direction in the example illustrated in FIG. 15), and extend along the direction of extension of the first portion 43*k*.

The first portion 43*k* and the second portion 43*m* can be alternately arranged by the second portion 43*m* including the crossing portion CP. In the example illustrated in FIG. 15, the first portion 43*k* and the second portion 43*m* are alternately arranged along the X direction. When a pair of the first portion 43*k* and the second portion 43*m* close to each other in the X direction is considered as one set, a plurality of sets (11 sets in FIG. 15) are aligned in the X direction. In each set, when the magnetic field lines link with the surface region R surrounded by the first portion 43*k* and the second portion 43*m*, an induced voltage is generated as described above. In this case, the direction of the induced voltage generated in one of two adjacent sets is opposite the direction of the induced voltage generated in the other set, so that the induced voltages generated in these sets are cancelled. As a result, the entire induced voltage Ei generated between the input part 41 and the output part 42 can be reduced, so that the impact of the induced voltage Ei on the accuracy of electrical resistance measurement of the conductive part 40 by the detection part 52 can be reduced. That is, the likelihood of false detections by the detection part 52 caused by the generation of the induced voltage Ei can be further reduced. At the crossing portion CP, since the first portion 43*k* and the second portion 43*m* are aligned spaced apart along the Z direction, the normal direction of the surface region R surrounded by the conductive pattern 43E is substantially at a right angle to the direction of the magnetic field H, similarly to the coil device 10A according to the first variation. The induced voltage Ei generated at the crossing portion CP is thus very small. Although a plurality of the crossing portions CP is illustrated in FIG. 15, in a part (some) or all of the plurality of the crossing portions CP, the second portion 43*m* may be closely adhered to the inner surface 22*a* and the first portion 43*k* may be arranged side by side with and spaced from the second portion 43*m* in the Z direction, in a manner that is the opposite of the configuration of the cross-sectional view illustrated in FIG. 16.

Figure 17:
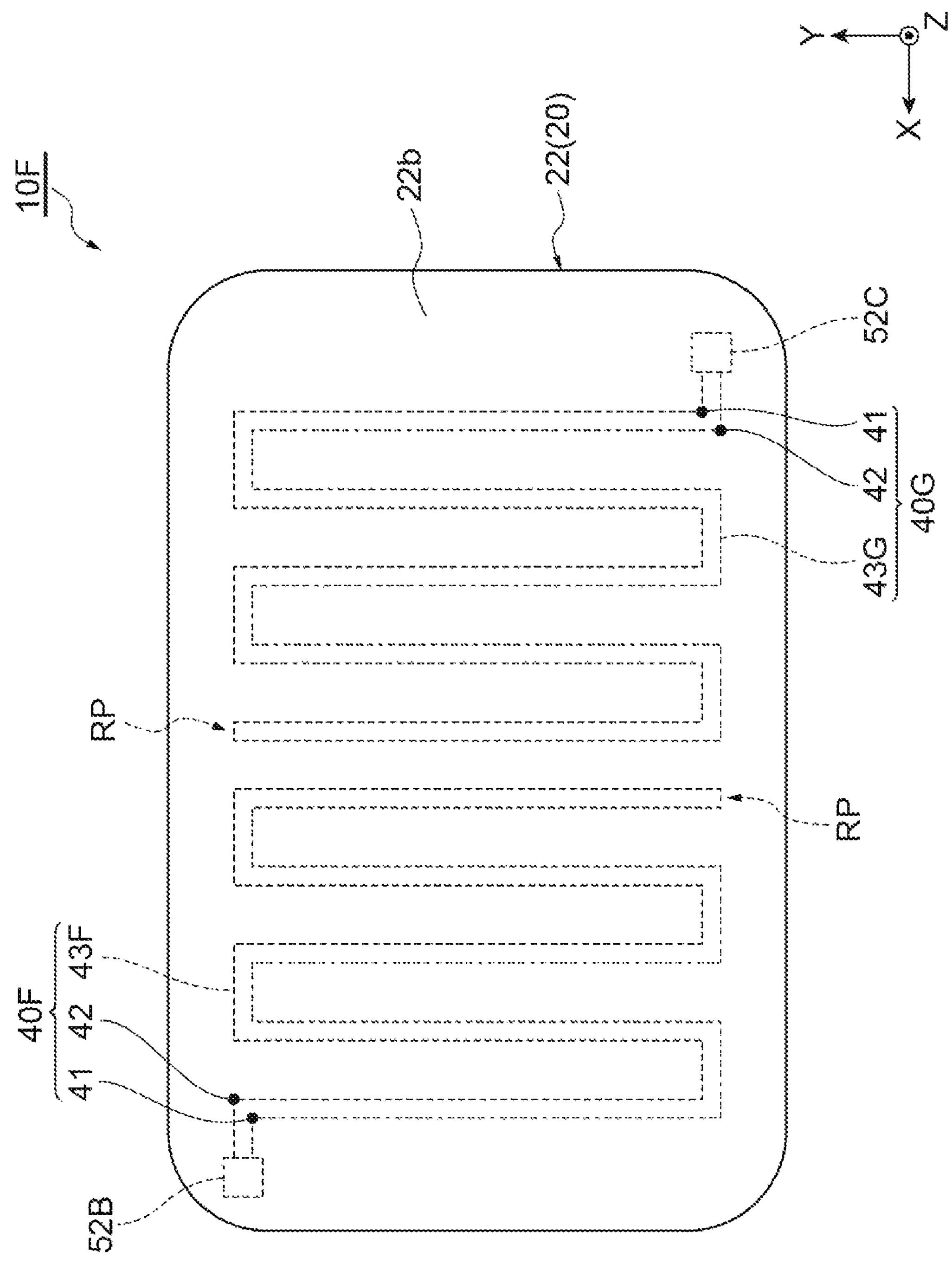
FIG. 17 is a top view illustrating a sixth variation of the coil device.

FIG. 17 illustrates a sixth variation of the coil device 10. The difference between a coil device 10F according to this variation and the coil device 10 according to the embodiment above is the numbers of the conductive parts and the detection parts of the coil device. As illustrated in FIG. 17, the coil device 10F includes a plurality of (two in the example illustrated in FIG. 17) conductive parts 40F and 40G, and a plurality of (two in the example illustrated in FIG. 17) detection parts 52B and 52C. A conductive pattern 43F of the conductive part 40F is provided in a region on one side of the cover 22 in the X direction, and a conductive pattern 43G of the conductive part 40G is provided in a region on the other side of the cover 22 in the X direction. The input part 41 and the output part 42 of the conductive part 40F are electrically connected to the detection part 52B, and the input part 41 and the output part 42 of the conductive part 40G are electrically connected to the detection part 52C. In the coil device 10F, when deformation occurs in the region on one side of the cover 22 in the X direction, it is detected by the detection part 52B, and when deformation occurs in the region on the other side of the cover 22 in the X direction, it is detected by the detection part 52C. The same effects as those of the embodiment above can also be obtained by this aspect. In this example, the region in which the conductive pattern 43F is provided and the region in which the conductive pattern 43G is provided are divided in the X direction. However, the region in which the conductive pattern 43F is provided and the region in which the conductive pattern 43G is provided may be divided in the Y direction or in any other direction or at any location as long as the conductive pattern 43F and the conductive pattern 43G are provided across the entire region of the cover 22. There may be three or more of the conductive parts and the detection parts, which may be provided across the entire region of the cover 22.

In the embodiment and the variations above, the case in which the coil device 10 is applied to the wireless power supply system 1 for charging the battery of a vehicle is described. However, the coil device may be applied to wireless power supply systems for charging batteries of movable objects other than vehicles, such as underwater vessels. The coil device may also be applied to wireless power supply systems for charging batteries of objects other than movable objects, such as consumer electronics, or may be applied to induction heating systems or eddy current flaw detection systems. The detection device composed of the conductive part and the detection part may be applied to devices other than the coil device, and may be applied to other devices which have no coils.

The configuration of the coil device is not limited to the embodiment and the variations above, and may be appropriately changed without departing from the scope of the claims. For example, in the embodiment and the variations above, the case in which the power transmitting coil is a circular coil has been described. However, the power transmitting coil may be other types of coils, such as a solenoid coil in which a conductive wire is helically wound in three-dimensional space. The shape, location, and arrangement of the ferrite plate may also be changed according to the type of the coil.

Figure 18:
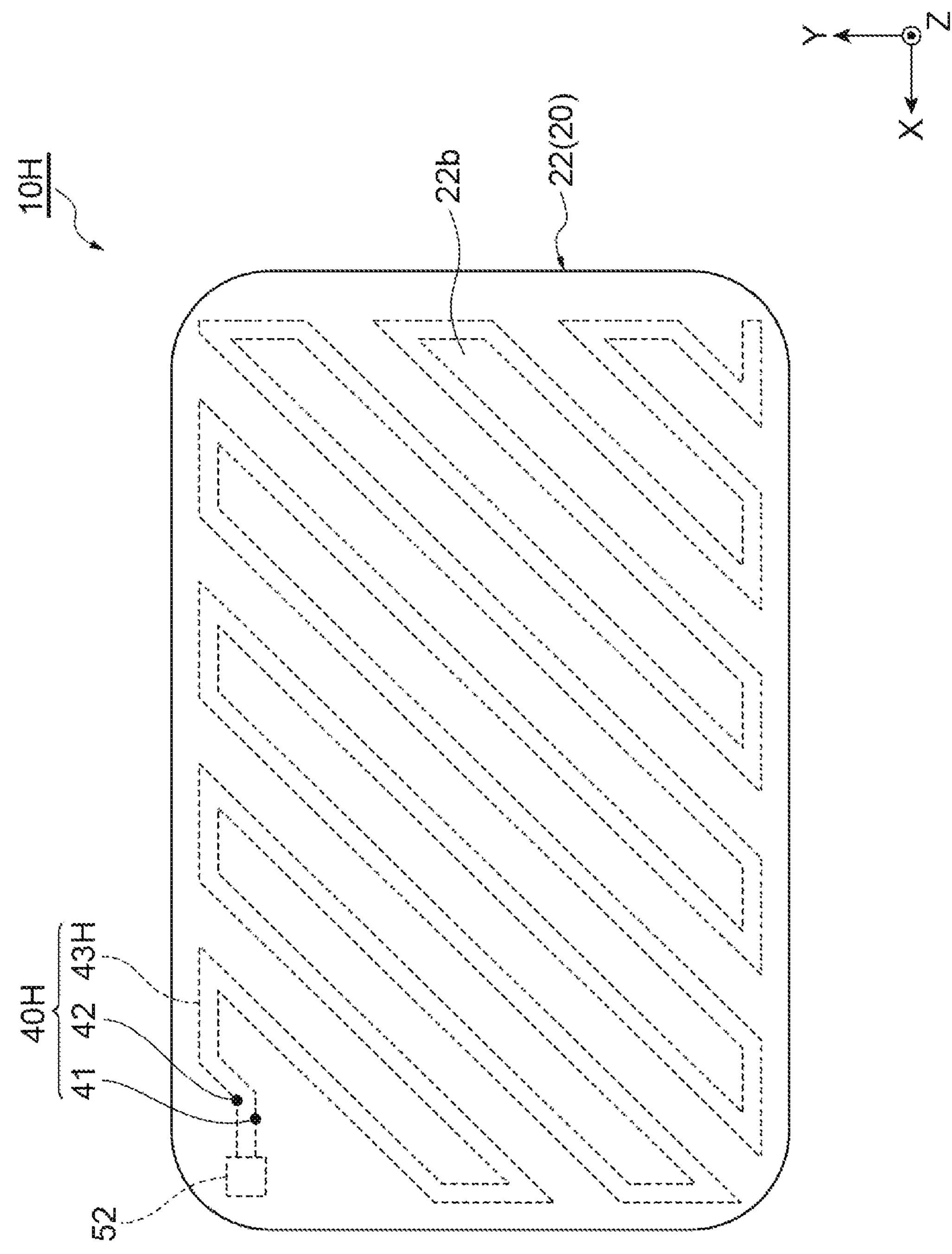
FIG. 18 is a top view illustrating a variation of the conductive pattern.

In the embodiment and the variations above, an example in which the conductive pattern 43 includes the portions P1 that extend in the X direction and the portions P2 that extend in the Y direction has been described. However, the directions in which the conductive pattern 43 extend are not limited to those in this example, and may be appropriately changed. For example, the conductive pattern 43 may extend in directions oblique to the X direction and the Y direction as long as the entire inner surface 22*a* is covered, such as in a conductive pattern 43H of a conductive part 40H of a coil device 10H illustrated in FIG. 18.

Figure 19:
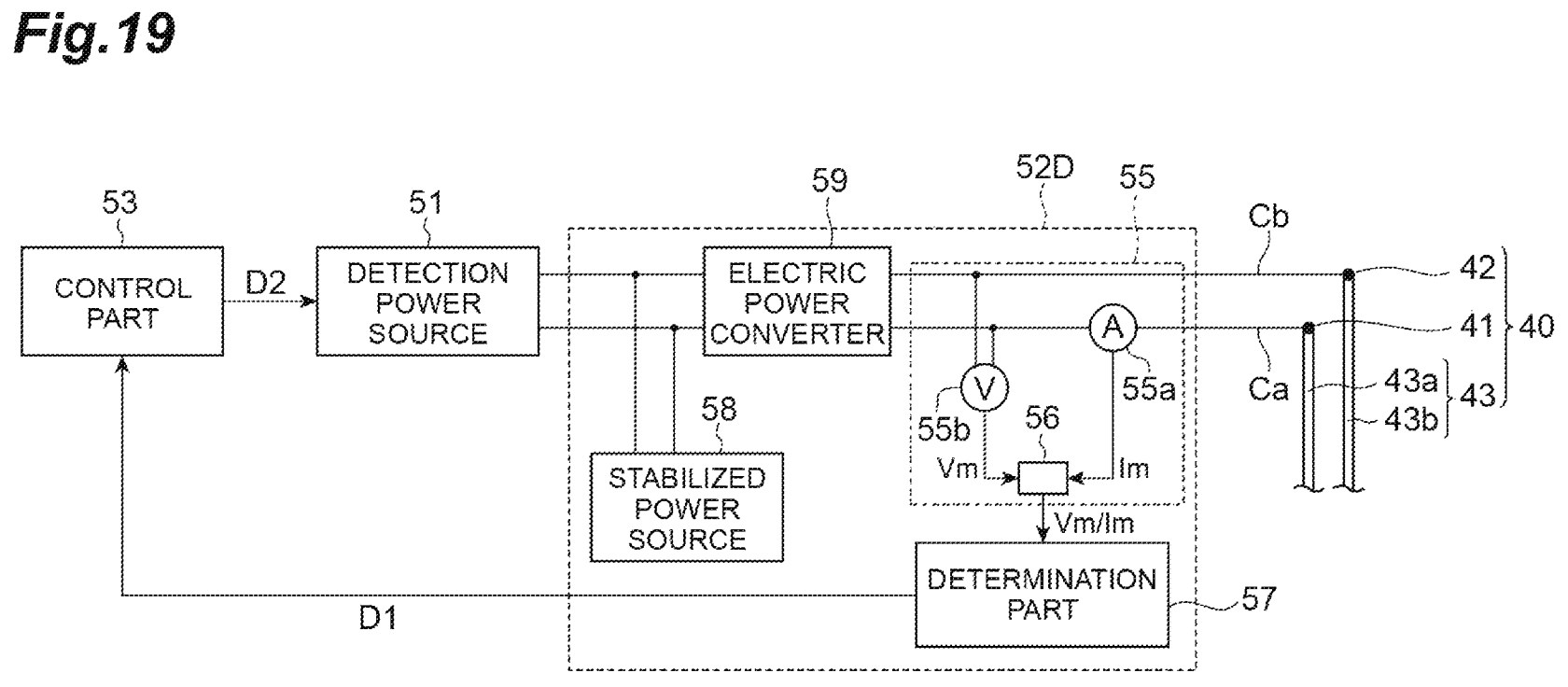

The configuration of the detection part is not limited to those of the embodiment and the variations above. For example, a detection part 52D may have an electric power converter 59 as illustrated in FIG. 19. In this case, the electric power converter 59 is provided between the detection power source 51 and the conductive part 40, and is connected to the connection wires Ca and Cb. The electric power converter 59 converts the electric power received from the detection power source 51 into electric power suitable for abnormality detection by the conductive part 40. The electric power converter 59, for example, may be a DC/DC converter that converts DC power supplied from the detection power source 51 into DC power having a voltage different from the voltage of the first DC power. Alternatively, the electric power converter 59 may be a transformer that converts AC power supplied from the detection power source 51 into AC power having a voltage different from the voltage of the first AC power. Alternatively, the electric power converter 59 may be an inverter that converts the DC power supplied from the detection power source 51 into AC power having a frequency different from the frequency of the high frequency AC power supplied by the drive power source 30 (that is, a frequency time varying the magnetic field generated by the power transmitting coil C2).

Figure 20:
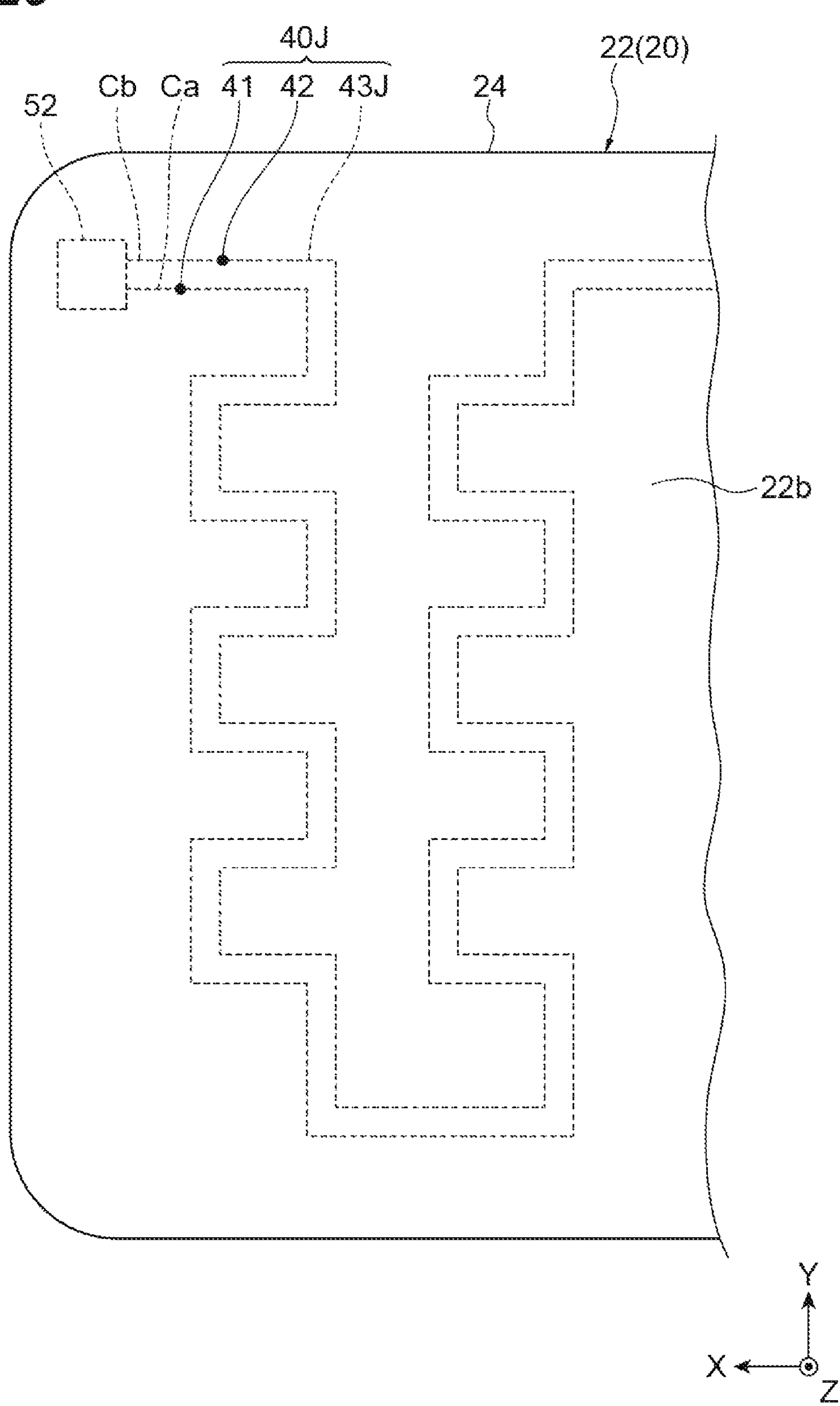
FIG. 20 is an enlarged top view illustrating another variation of the conductive pattern.

In a case in which the casing 20 is formed of a resin including fibers such as a glass-fiber reinforced resin, a conductive pattern 43J of a conductive part 40J may have portions extending in directions intersecting the directions of extension of the fibers as illustrated in FIG. 20. FIG. 20 is an enlarged top view of a portion of the conductive pattern 43J. In the example illustrated in FIG. 20, the conductive pattern 43J extends in a zigzag manner in the X direction and the Y direction so as to follow the directions perpendicular to the directions of extension of the fibers. The directions of cracks in the casing 20 tend to be along the directions of extension of the fibers. Thus, the detection of deformation in the casing 20 based on the energized state of the conductive pattern 43J can be more reliably performed as described above by the conductive pattern 43J having portions extending along the directions intersecting the directions of extension of the fibers.

Figures 21A, 21B:
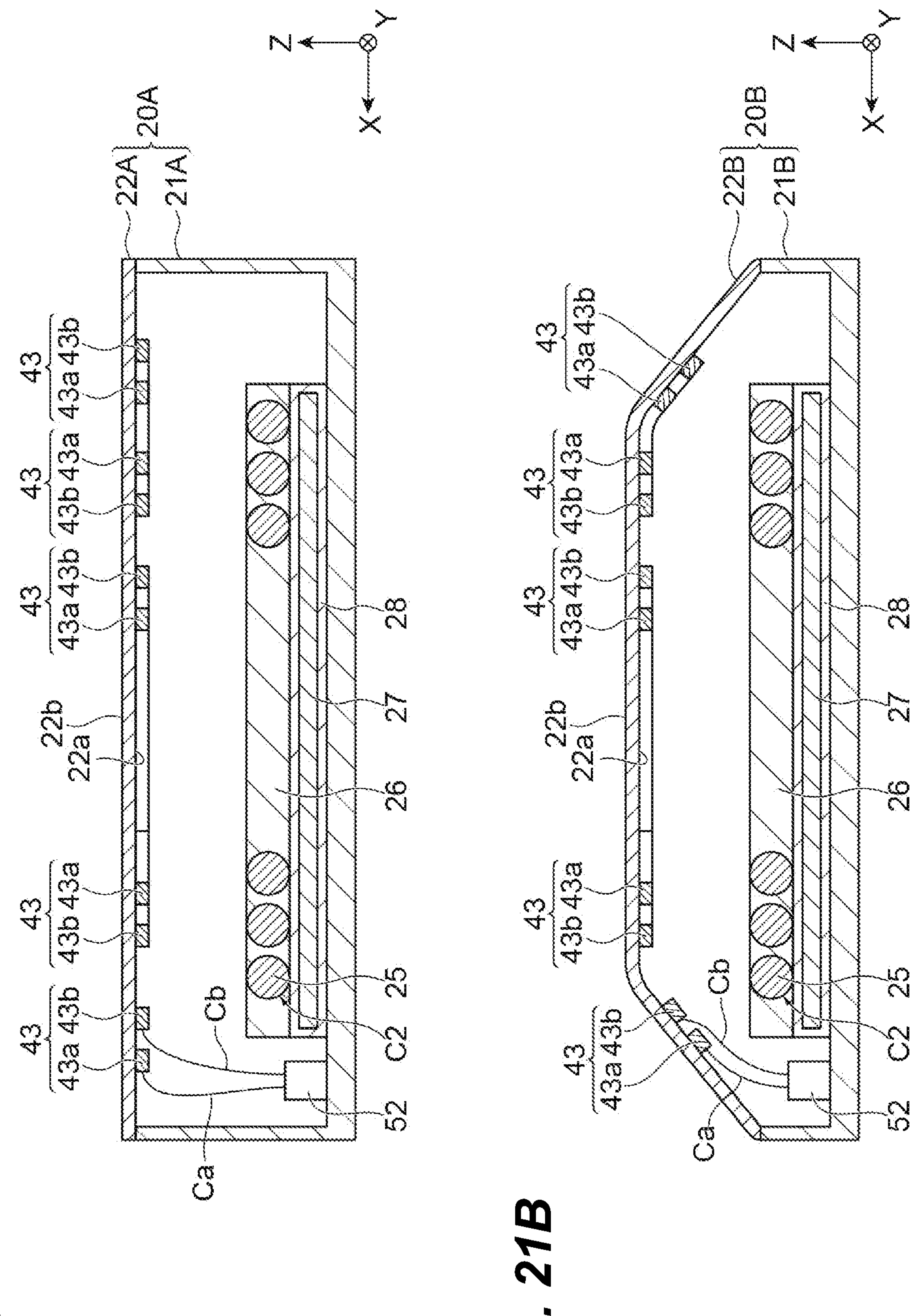
FIG. 21A is a cross-sectional view illustrating a variation of a casing.
FIG. 21B is a cross-sectional view illustrating another variation of the casing.

The configuration of the casing is not limited to those of the embodiment and the variations above. For example, the base is not limited to a plate-shaped member that ensures the general rigidity of the coil device. The cover may have rigidity, if the general rigidity of the coil device is ensured by the combination of the base and the cover, and the function as the coil device can be exhibited. Alternatively, as shown in FIG. 21A, a casing 20A may be composed of a combination of a bottomed rectangular tube-shaped base 21A having a depth in the Z direction and a plate-shaped cover 22A. Alternatively, the base and the cover may have other shapes. For example, as illustrated in FIG. 21B, a casing 20B may be composed of a combination of a bottomed rectangular tube-shaped base 21B having a depth less than the depth of the base 21A and a bowl-shaped cover 22B provided so as to close an opening of the base 21B.

REFERENCE SIGNS LIST

2 Power supply device
5 Power source part
10, 10A, 10B, 10C, 10D, 10E, 10F, 10H Coil device
20 Casing
21 Base
22 Cover
22*a* Inner surface
40, 40A, 40E, 40F, 40G, 40H, 40J Conductive part
41 Input part
42 Output part
43, 43A, 43B, 43C, 43E, 43F, 43G, 43H, 43J Conductive pattern
43*a*, 43*c*, 43*e*, 43*g*, 43*i*, 43*k* First portion
43*b*, 43*d*, 43*f*, 43*h*, 43*j*, 43*m* Second portion
52, 52A, 52B, 52C, 52D Detection part
53 Control part
60 Detection device
Cd, Ce Connection part
CP Crossing portion
P1, P2 Portion
R Surface region

The invention claimed is:

1. A coil device comprising:
a coil generating a magnetic field;
a casing accommodating the coil;
a conductive part including an input part, an output part, and a conductive pattern connecting the input part to the output part, the conductive part being provided on the casing, and electrically insulated from the casing; and
a detection part electrically connected to the input part and the output part, energizing the conductive pattern via the input part and the output part, and detecting deformation in the casing based on an energized state of the conductive pattern,
wherein the conductive pattern includes a first portion and a second portion arranged side by side on a pattern arrangement surface of the casing, and wherein electric currents in the first portion and in the second portion flow in opposite directions when energized,
wherein the conductive pattern includes a plurality of first linear portions extending in one direction of in-plane directions of the pattern arrangement surface, and a plurality of second linear portions extending in an other direction of the in-plane directions intersecting the one direction,
wherein the first linear portions and the second linear portions are alternately connected,
wherein the first portion is an outward path extending from the input part to a turn-back position,
wherein the second portion is a return path extending from the turn-back position to the output part,
wherein the outward path and the return path each include the plurality of first linear portions and the plurality of second linear portions, and
wherein at least three pairs, each pair comprising one of the first linear portions of the outward path and an adjacent one of the first linear portions of the return path, are arranged side-by-side on the pattern arrangement surface.

2. The coil device according to claim 1, wherein the second portion is arranged side by side with the first portion along a direction intersecting a normal direction of the pattern arrangement surface, and extends along a direction of extension of the first portion.

3. The coil device according to claim 1, wherein the second portion is arranged side by side with the first portion along a normal direction of the pattern arrangement surface, and extends so as to overlap the first portion when viewed in the normal direction.

4. The coil device according to claim 1, wherein the second portion includes a crossing portion crossing the first portion when viewed in a normal direction of the pattern arrangement surface, and is arranged side by side with the first portion along the normal direction at the crossing portion.

5. The coil device according to claim 1, wherein the pattern arrangement surface is an inner surface of the casing facing the coil.

6. The coil device according to claim 1, wherein
the casing includes a cover and a base defining an accommodation space for accommodating the coil,
the cover is removably attached to the base, wherein the input part and the output part are provided on the cover,
the detection part includes a pair of connection parts provided on the base, and
the pair of connection parts are electrically connected to the input part and the output part, respectively, by the cover being attached to the base.

7. A power supply device comprising:
the coil device according to claim 1; and a power source part supplying electric power to the coil, and wherein the power source part stops supplying electric power to the coil when the detection part detects the deformation in the casing.

8. The coil device according to claim 1, wherein the casing includes a cover having the pattern arrangement surface, the pattern arrangement surface includes a first surface portion along the one direction and the other direction, and a second surface portion inclined with respect to the first surface portion, and the conductive pattern is arranged across both the first surface portion and the second surface portion.

* * * * *